(12) United States Patent
Omote et al.

(10) Patent No.: US 10,063,626 B2
(45) Date of Patent: Aug. 28, 2018

(54) INFORMATION SYSTEM, SERVER APPARATUS, TERMINAL APPARATUS, AND INFORMATION PROCESSING METHOD

(71) Applicant: Future Tech Lab Co., Ltd., Kanazawa-shi, Ishikawa (JP)

(72) Inventors: Yasuo Omote, Kanazawa (JP); Satoya Nakagawa, Kanazawa (JP)

(73) Assignee: Future Tech Leb Co., Ltd., Ishikawa (JP)

( * ) Notice: Subject to any disclaimer, the term of this patent is extended or adjusted under 35 U.S.C. 154(b) by 112 days.

(21) Appl. No.: 14/439,923

(22) PCT Filed: Oct. 1, 2013

(86) PCT No.: PCT/JP2013/076697
§ 371 (c)(1),
(2) Date: Apr. 30, 2015

(87) PCT Pub. No.: WO2014/069145
PCT Pub. Date: May 8, 2014

(65) Prior Publication Data
US 2015/0304396 A1 Oct. 22, 2015

(30) Foreign Application Priority Data

Oct. 31, 2012 (JP) ................................. 2012-241026
Nov. 2, 2012 (JP) ................................. 2012-242420

(51) Int. Cl.
*H04L 29/08* (2006.01)
*H04M 1/725* (2006.01)
*H04L 29/06* (2006.01)

(52) U.S. Cl.
CPC .............. *H04L 67/10* (2013.01); *H04L 67/42* (2013.01); *H04M 1/72544* (2013.01); *H04L 67/38* (2013.01)

(58) Field of Classification Search
CPC ............... H04L 67/1097; H04L 67/025; H04L 43/0876; H04L 67/10; G06F 3/067; G06F 2212/7207; G06F 15/16
(Continued)

(56) References Cited

U.S. PATENT DOCUMENTS 5,287,535 A * 2/1994 Sakagawa ............. H04L 49/104
370/389
5,857,187 A 1/1999 Uenoyama et al.
(Continued)

FOREIGN PATENT DOCUMENTS

| JP | H09-081445 A | 3/1997 |
|---|---|---|
| JP | H11-242546 A | 9/1999 |

(Continued)

OTHER PUBLICATIONS

Notification of Reasons for Rejection dated Aug. 17, 2016 issued in Japanese Patent Application No. 2012-241026.
(Continued)

*Primary Examiner* — Tesfay Yohannes
(74) *Attorney, Agent, or Firm* — Troutman Sanders LLP

(57) ABSTRACT

A server apparatus includes: a receiving unit that receives a terminal request from a terminal apparatus; a terminal request processing unit that interprets the terminal request, thereby acquiring scenario base information corresponding to the terminal request, and performs processing corresponding to the terminal request; a scenario generating unit that generates a scenario, using the scenario base information, and a processing result of the terminal request processing unit; and a transmitting unit that transmits the scenario generated by the scenario generating unit, to the terminal apparatus.

15 Claims, 27 Drawing Sheets

(58) Field of Classification Search
USPC .................. 709/203, 178; 717/178, 203
See application file for complete search history.

(56) References Cited

U.S. PATENT DOCUMENTS

| | | | | |
|---|---|---|---|---|
| 5,909,688 | A * | 6/1999 | Yoshioka | G06F 17/30958 |
| 6,306,089 | B1 * | 10/2001 | Coleman | G01S 7/52023 |
| | | | | 128/916 |
| 7,774,560 | B2 * | 8/2010 | Liu | G06F 3/0607 |
| | | | | 703/23 |
| 7,787,143 | B2 * | 8/2010 | Fukuda | G06F 3/1205 |
| | | | | 358/1.1 |
| 8,261,260 | B2 * | 9/2012 | Nagashima | G06F 9/4411 |
| | | | | 717/176 |
| 8,314,683 | B2 * | 11/2012 | Pfeffer | G08B 25/006 |
| | | | | 340/7.3 |
| 8,482,531 | B2 * | 7/2013 | Karoji | G09B 19/0053 |
| | | | | 345/173 |
| 8,634,775 | B2 * | 1/2014 | Oshiba | H04L 67/1095 |
| | | | | 455/41.2 |
| 8,850,459 | B2 * | 9/2014 | Nakata | G06F 9/4411 |
| | | | | 700/219 |
| 8,988,188 | B2 * | 3/2015 | Chang | G07C 9/00563 |
| | | | | 340/5.53 |
| 9,092,381 | B2 | 7/2015 | Sasakura et al. | |
| 2004/0122896 | A1 | 6/2004 | Gourraud | |
| 2006/0254888 | A1 | 11/2006 | Okada et al. | |
| 2007/0152058 | A1 * | 7/2007 | Yeakley | G06F 17/2247 |
| | | | | 235/462.01 |
| 2012/0233244 | A1 | 9/2012 | Sugaya | |
| 2012/0239783 | A1 | 9/2012 | Sugaya | |
| 2012/0291023 | A1 * | 11/2012 | Lu | G06F 9/4411 |
| | | | | 717/178 |
| 2013/0013692 | A1 | 1/2013 | Sasakura et al. | |

FOREIGN PATENT DOCUMENTS

| | | |
|---|---|---|
| JP | 2001-249742 A | 9/2001 |
| JP | 2001-265682 A | 9/2001 |
| JP | 2003-186792 A | 7/2003 |
| JP | 2006-512640 A | 4/2006 |
| JP | 2006-304986 A | 11/2006 |
| JP | 2007122647 A | 5/2007 |
| JP | 2009-110300 A | 5/2009 |
| JP | 2009230397 A | 10/2009 |
| JP | 2011-180951 A | 9/2011 |
| JP | 2012-190242 A | 10/2012 |
| JP | 2012-195843 A | 10/2012 |
| WO | 2004059946 A1 | 7/2004 |
| WO | 2012063395 A1 | 5/2012 |

OTHER PUBLICATIONS

International Search Report and Written Opinion dated Dec. 24, 2013 that issued during prosecution of International Application No. PCT/JP2013/076697.
European Extended Search Report dated Jun. 15, 2016, issued in corresponding European Patent Application No. 13850723.1.
Japanese Office Action dated May 26, 2016, issued in corresponding Japanese Patent Application No. JPA2012-241026.
Notification of Reasons for Rejection dated Dec. 19, 2016 issued in JPA-2012-242420 and English Translation.
Notification of Reasons for Refusal dated Oct. 27, 2017 during the prosecution of Japanese Patent Application No. 2016-199993.

* cited by examiner

| ID | Driver identifier | Driver calling function |
|---|---|---|
| 1 | Character | show_char() |
| 2 | Voice reproduction | voice() |
| 3 | U I | ui() |
| 4 | Terminal camera | camera() |
| 5 | Terminal telephone | tel() |
| 6 | Terminal mail | mail() |
| 7 | Data management | data_manage() |

FIG.6

| ID | Character | Entire region information | Part information | | Display flag | ... |
|---|---|---|---|---|---|---|
| | | | Part identifier | Partial region information | | |
| 1 |  | (x11, y11)<br>(x12, y12)<br>(x13, y13)<br>⋮<br>(x1n, y1n) | 1 | (x101, y101)<br>(x102, y102)<br>⋮ | 1 | ... |
| | | | 2 | (x103, y103)<br>(x104, y104)<br>⋮ | | |
| | | | ⋮ | ⋮ | | |
| 2 |  | (x21, y21)<br>(x22, y22)<br>(x23, y23)<br>⋮<br>(x2m, y2m) | 1 | (x201, y201)<br>⋮ | 0 | ... |
| | | | 2 | (x202, y202)<br>⋮ | | |
| | | | 3 | (x203, y203)<br>⋮ | | |
| | | | ⋮ | ⋮ | | |
| 3 |  | ⋮ | ⋮ | ⋮ | 0 | ... |
| ⋮ | ⋮ | ⋮ | ⋮ | ⋮ | ⋮ | ⋮ |
FIG.7

| ID | Terminal request | Scenario base information |
|---|---|---|
| 1 | "increase volume" | volume_up($ terminal identifier, 1) |
| 2 | "volume" $ numerical value "increase" | volume_up($ terminal identifier, $ numerical value) |
| 3 | touch($ object identifier, $ part identifier) | if($ part identifier==1){<br>if($ terminal identifier. $ affinity level==high){<br>  show_char($ object identifier, ID=2);<br>}<br>else if($ terminal identifier. $ affinity level==middle){<br>  show_char($ object identifier, ID=3);<br>}<br>else{show_char($ object identifier, ID=4);<br>}<br>else if($ part identifier==2){<br>⋮<br>}<br>else{<br>⋮<br>} |
| 4 | "come here" | ch=get_char($ user identifier, $ character);<br>  delete($ user identifier, $ character);<br>  put_char($ terminal identifier, ch); |
| 5 | $ person.* "bring here" | terminal=search($ terminal identifier, $ person);<br>if(terminal !=NULL){<br>  put($ positional information, terminal);<br>  start_up(navi());<br>  set_destination($ positional information);<br>  route_search($ current position, $ destination position);<br>}<br>else{send_message($ person "who is ?");} |

FIG.8

| ID | Terminal identifier | Driver identifier | ... |
|---|---|---|---|
| 1 | 101 | Character<br>Voice reproduction<br>U I<br>Terminal camera<br>Terminal telephone<br>Terminal mail<br>Data management | ... |
| 2 | 103 | Character<br>Voice reproduction<br>U I<br>Terminal telephone<br>Data management | ... |
| ⋮ | ⋮ | ⋮ | ⋮ |

FIG.9

| Group ID | Terminal identifier |
|---|---|
| 1 | 101, 102, 103 |
| 2 | 201, 202, 203, 204 |
| 3 | 301, 302, 303, 304, 305, 306 |
| ⋮ | ⋮ |

FIG.10

| ID | Terminal identifier | Request history | Affinity level | ・・・・・ |
|---|---|---|---|---|
| 1 | 101 | ⋮ <br> (1, 1, touch) <br> (1, 2, touch) | High | ・・・・・ |
| 2 | 102 | ⋮ <br> (2, -, drag) <br> ⋮ | Low | ・・・・・ |
| ⋮ | ⋮ | ⋮ | ⋮ | ⋮ |

FIG.11

| ID | Terminal identifier 1 | Relationship | Terminal identifier 2 |
|---|---|---|---|
| 1 | 101 | Grandma | 103 |
| 2 | 201 | Mom | 202 |
| 3 | 203 | Grandpa | 204 |
| 4 | 301 | Dad | 302 |
| ⋮ | ⋮ | ⋮ | ⋮ |

FIG.12

| ID | Character ID | Data | |
|---|---|---|---|
| | | Image | Voice |
| 1 | 1 |  | — |
| 2 | 1 |  | Oh no |
| 3 | 1 |  | You're naughty |
| 4 | 1 |  | Why won't you stop?... (sobbing) |
| ⋮ | ⋮ | ⋮ | ⋮ |
FIG.14

| ID | Terminal request | Scenario base information |
|---|---|---|
| 1 | $ character "come here" | call($ character); |
| 2 | "volume" $ numerical value "increase" | volume_up($ terminal identifier, $ numerical value) |
| 3 | touch($ object identifier, $ part identifier) | if($ part identifier==1){<br>  if($ terminal identifier. $ affinity level==high){<br>    show_char($ object identifier, ID=2);<br>  }<br>  else if($ terminal identifier. $ affinity level==middle){<br>    show_char($ object identifier, ID=3);<br>  }<br>  else{show_char($ object identifier, ID=4);<br>  }<br>  else if($ part identifier==2){<br>    ⋮<br>  }<br>  else{<br>    ⋮<br>  } |
| 4 | "come here" | ch=get_char($ user identifier, $ character);<br>  delete($ user identifier, $ character);<br>  put_char($ terminal identifier, ch); |
| 5 | $ person.*"bring here" | terminal=search($ terminal identifier, $ person);<br>if(terminal !=NULL){<br>  if(terminal. power==OFF){<br>    tel(terminal, "turn power on");<br>  }<br>  put($ positional information, terminal);<br>  start_up(navi());<br>  set_destination($ positional information);<br>  route_search($ current position, $ destination position);<br>}<br>else{send_message($ person "who is ?");} |

FIG.20

| ID | Type identifier | Driver identifier |
|---|---|---|
| 1 | K01 | Character |
| | | Voice reproduction |
| | | U I |
| | | Terminal camera |
| | | Terminal telephone |
| | | Terminal |
| | | Data management |
| 2 | K02 | Character |
| | | U I |
| | | Terminal telephone |
| | | Data management |
| ⋮ | ⋮ | ⋮ |

FIG.21

| ID | Terminal identifier | Type identifier |
|---|---|---|
| 1 | 101 | k01 |
| 2 | 102 | k02 |
| 3 | 103 | k03 |
| 4 | 201 | p01 |
| ⋮ | ⋮ | ⋮ |

FIG.22

| ID | Terminal identifier | Current information ||||| 
| | | Object identifier | Output position | Image ID | ... | Power |
| --- | --- | --- | --- | --- | --- | --- |
| 1 | 101 | – | – | – | ... | 1 |
| 2 | 102 | 2 | (0,0) | ... | ... | 1 |
| 3 | 201 | 3 | (50,50) | ... | ... | 1 |
| 4 | 103 | – | – | ... | ... | 0 |
| ⋮ | ⋮ | ⋮ | ⋮ | ⋮ | ⋮ | ⋮ |

FIG.23

| ID | User identifier | Terminal identifier |
|---|---|---|
| 1 | A | 101 |
| 2 | B | 103 |
| 3 | C | 201 |
| ⋮ | ⋮ | ⋮ |

FIG.24

| ID | Character ID | Name | Data | | Part information | |
|---|---|---|---|---|---|---|
| | | | Image | Voice | Part identifier | Partial region information |
| 1 | 1 | Y-chan |  | – | 1 | (x101,y101) (x102,y102) ⋮ |
| | | | | | 2 | (x103,y103) (x104,y104) ⋮ |
| | | | | | ⋮ | ⋮ |
| 2 | 1 | – |  | Oh no | 1 | (x201,y201) (x202,y202) ⋮ |
| | | | | | ⋮ | ⋮ |
| 3 | 1 | – |  | You're naughty | ⋮ | ⋮ |
| 4 | 1 | – |  | Why won't you stop?... (sobbing) | ⋮ | ⋮ |
| ⋮ | ⋮ | ⋮ | ⋮ | ⋮ | ⋮ | ⋮ |
| 67 | 2 | Apple-chan |  | Hello | ⋮ | ⋮ |
| ⋮ | ⋮ | ⋮ | ⋮ | ⋮ | ⋮ | ⋮ |
| 128 | 3 | Orange-chan |  | What's up? | ⋮ | ⋮ |
| ⋮ | ⋮ | ⋮ | ⋮ | ⋮ | ⋮ | ⋮ |
FIG.25

INFORMATION SYSTEM, SERVER APPARATUS, TERMINAL APPARATUS, AND INFORMATION PROCESSING METHOD

CROSS REFERENCE TO RELATED APPLICATIONS

This application is a U.S. National Phase Application under 35 U.S.C. § 371 of International Patent Application No. PCT/JP2013/076697 filed Oct. 1, 2013 which claims priority to Japanese Patent Application Nos. 2012-241026, filed on Oct. 31, 2012, and 2012-242420, filed on Nov. 2, 2012. The International Application was published on May 8, 2014, as International Publication No. WO/2014/069145 under PCT Article 21(2). The entire contents of these applications are hereby incorporated by reference.

TECHNICAL FIELD

The present invention relates to an information system and the like in which, in response to an operation of a terminal apparatus, a command for operating a terminal-side driver is transmitted from a server to the terminal apparatus.

BACKGROUND ART

Conventionally, there is a client-server system that can dynamically display screens while reducing a server's burden by effectively utilizing the functions of the web browser on the client side (see Patent Document 1).

CITATION LIST

Patent Document

[Patent Document 1] JP 2003-186792A (p. 1, FIG. 1, etc.)

SUMMARY OF INVENTION

Technical Problem

However, with conventional systems, it is not possible to allow a terminal apparatus including one or more pieces of hardware driven by drivers and not having sufficient information processing ability, to perform complicated information processing while effectively utilizing the one or more pieces of hardware.

Solution to Problem

A first aspect of the present invention is directed to an information system, including one or at least two terminal apparatuses and a server apparatus, wherein each of the terminal apparatuses includes: one or more terminal function units each of which is driven by a driver; a terminal driver management unit in which one or more driver identifiers each for identifying the driver of each of the one or more terminal function units can be stored; a terminal accepting unit that accepts one or more instructions from a user; a terminal request constructing unit that constructs a terminal request, which is a request corresponding to the one or more instructions; a terminal transmitting unit that transmits the terminal request to the server apparatus; a terminal receiving unit that receives a scenario having a command and data from the server apparatus, in response to transmission of the terminal request; a terminal parser unit that interprets the scenario, thereby acquiring the one or more driver identifiers and data that is to be given to one or more terminal function units identified with the one or more driver identifiers, the data being contained in the scenario; and a terminal function calling unit that gives the data acquired by the terminal parser unit, to the one or more terminal function units identified with the one or more driver identifiers acquired by the terminal parser unit, thereby calling the one or more terminal function units; and the server apparatus includes: a correspondence information storage unit in which one or more pieces of correspondence information each indicating correspondence between information forming a terminal request and scenario base information, which is information based on which a scenario is to be constructed, can be stored; a receiving unit that receives a terminal request from the terminal apparatus; a terminal request processing unit that interprets the terminal request received by the receiving unit, thereby acquiring scenario base information corresponding to the terminal request, from the correspondence information storage unit, and performs processing corresponding to the terminal request received by the receiving unit; a scenario generating unit that generates a scenario, using the scenario base information acquired by the terminal request processing unit, and a processing result of the processing performed by the terminal request processing unit; and a transmitting unit that transmits the scenario generated by the scenario generating unit, to the terminal apparatus.

With this configuration, it is possible to allow a terminal apparatus including one or more pieces of hardware driven by drivers and not having sufficient information processing ability, to perform complicated information processing while effectively utilizing the one or more pieces of hardware.

Furthermore, a second aspect of the present invention is directed to the information system according to the first aspect, wherein each of the terminal apparatuses further includes: a terminal object storage unit in which one or more objects can be stored; and a terminal object output unit that outputs the one or more objects; the scenario has an operation command, which is a command indicating an operation of an object, the terminal parser unit interprets the scenario, thereby acquiring an operation command from the scenario, and the terminal object output unit causes an object corresponding to the operation command to operate according to the operation command.

With this configuration, it is possible to allow a terminal apparatus including one or more pieces of hardware driven by drivers and not having sufficient information processing ability, to perform complicated operation processing of objects such as animation while effectively utilizing the one or more pieces of hardware.

Furthermore, a third aspect of the present invention is directed to the information system according to the first or second aspect, wherein the server apparatus further includes: a history storage unit in which one or more request histories, each of which is part or the whole of a terminal request, can be stored; and a history accumulating unit that accumulates a request history, which is part or the whole of the terminal request received by the receiving unit, in the history storage unit; and the scenario generating unit generates a scenario, using the terminal request received by the receiving unit and the one or more request histories stored in the history storage unit.

With this configuration, it is possible to realize different operations in the terminal apparatus, based on a history of user operations at the terminal apparatus.

Furthermore, a fourth aspect of the present invention is directed to the information system according to any one of the first to third aspects, wherein the server apparatus further includes a server driver management unit in which one or more driver identifiers each for identifying the driver of each of the terminal function units included in the terminal apparatus can be stored, and the scenario generating unit generates different scenarios according to the one or more driver identifiers stored in the server driver management unit.

With this configuration, it is possible to realize an appropriate operation in the terminal apparatus, according to the hardware configuration of the terminal apparatus.

Furthermore, a fifth aspect of the present invention is directed to the information system according to the third or fourth aspect, wherein the server apparatus further includes: a statistical processing result acquiring unit that performs statistical processing on the request histories, thereby acquiring a statistical processing result; and a statistical processing result output unit that outputs the statistical processing result.

With this configuration, it is possible to perform statistical processing on user operations at the terminal apparatus.

Furthermore, a sixth aspect of the present invention is directed to the information system according to any one of the first to fifth aspects, wherein the scenario generated by the scenario generating unit contains a command for another terminal apparatus, which is different from the terminal apparatus, and the transmitting unit transmits the command to the other terminal apparatus.

With this configuration, based on a user operation at one terminal apparatus, another terminal apparatus can be operated.

Furthermore, a seventh aspect of the present invention is directed to the information system according to the sixth aspect, wherein the server apparatus further includes a group information storage unit in which group information can be stored, which is information specifying a group of two or more terminal apparatuses and is information having two or more terminal identifiers each for identifying each of the two or more terminal apparatuses, and the transmitting unit transmits no command to a terminal apparatus corresponding to none of the two or more terminal identifiers contained in the group information.

With this configuration, based on a user operation at one terminal apparatus, only other terminal apparatuses managed in that group can be operated.

Furthermore, an eighth aspect of the present invention is directed to the information system according to the first aspect, wherein the server apparatus further includes a current information storage unit in which current information, which is information indicating a current state of a terminal apparatus, can be stored for each terminal apparatus, the scenario generating unit generates a scenario, using the scenario base information acquired by the terminal request processing unit, a processing result of the processing performed by the terminal request processing unit, and current information corresponding to the terminal apparatus, and the server apparatus further includes a current information update unit that updates the current information in response to transmission of the scenario to the terminal apparatus.

With this configuration, the server apparatus manages the current statuses of terminal apparatuses, thereby making it possible to allow a terminal apparatus not having sufficient information processing ability, to perform complicated information processing while effectively utilizing one or more pieces of hardware.

Furthermore, a ninth aspect of the present invention is directed to the information system according to the eighth aspect, further including a user management information storage unit in which one or more pieces of user management information each for associating a user identifier for identifying a user of a terminal apparatus and a terminal identifier can be stored; and a user management information changing unit that, in a case where the terminal request is a request to change a terminal apparatus on which processing is to be performed, changes the terminal identifier contained in the user management information and corresponding to a user identifier of a user of the terminal apparatus from which the terminal request was transmitted, to a terminal identifier of a new terminal apparatus so that the terminal apparatus on which processing is to be performed is changed from a previous terminal apparatus, which is a terminal apparatus on which processing is currently being performed, to the new terminal apparatus; the scenario generating unit generates a scenario, using current information of the previous terminal apparatus, and the transmitting unit transmits the scenario generated by the scenario generating unit, to the new terminal apparatus.

With this configuration, it is possible to change terminal apparatuses on which processing is to be performed, during the processing.

Advantageous Effects of Invention

According to the information system of the present invention, it is possible to allow a terminal apparatus including one or more pieces of hardware driven by drivers and not having sufficient information processing ability, to perform complicated information processing while effectively utilizing the one or more pieces of hardware.

BRIEF DESCRIPTION OF DRAWINGS

FIG. 6 is a diagram showing a terminal driver management table in the embodiment.

FIG. 7 is a diagram showing a terminal object management table in the embodiment.

FIG. 8 is a diagram showing a correspondence information management table in the embodiment.

FIG. 9 is a diagram showing a server driver management table in the embodiment.

FIG. 10 is a diagram showing a group information management table in the embodiment.

FIG. 11 is a diagram showing a history management table in the embodiment.

FIG. 12 is a diagram showing a related user management table in the embodiment.

FIG. 14 is a diagram showing a character management table in the embodiment.

FIG. 20 is a diagram showing a correspondence information management table in the embodiment.

FIG. 21 is a diagram showing an example of a type-based driver information management table in the embodiment.

FIG. 22 is a diagram showing a terminal management information management table in the embodiment.

FIG. 23 is a diagram showing a current information management table in the embodiment.

FIG. 24 is a diagram showing a user management information management table in the embodiment.

FIG. 25 is a diagram showing a character management table in the embodiment.

DESCRIPTION OF EMBODIMENTS

Figure 1:
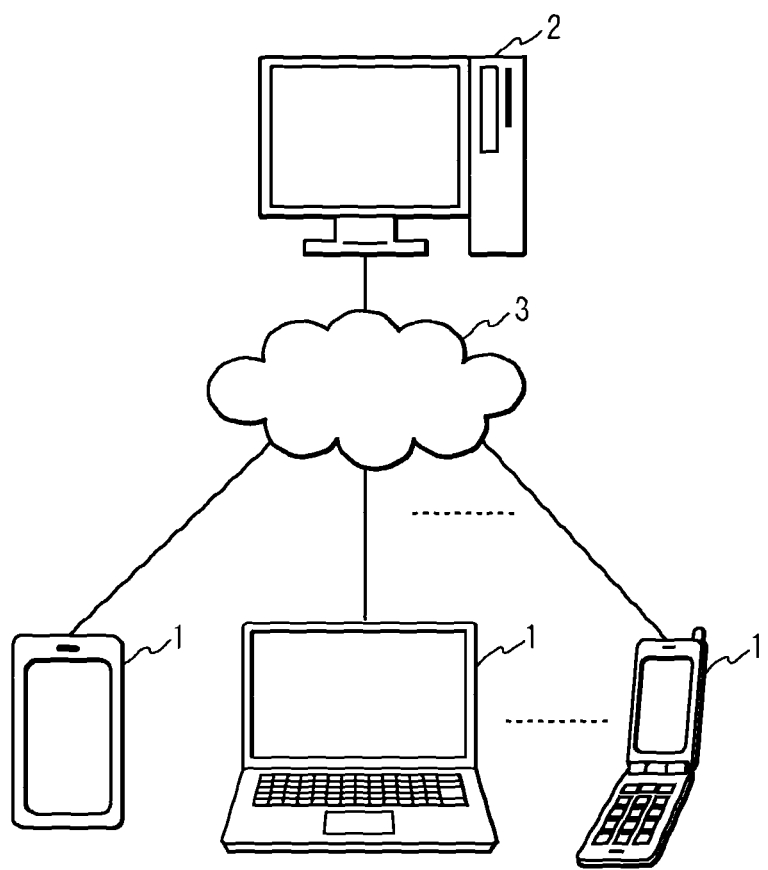
FIG. 1 is a conceptual diagram of an information system in Embodiment 1.

Hereinafter, embodiments of an information system and the like will be described with reference to the drawings. Note that constituent elements denoted by the same reference numerals perform the same operations in the embodiments, and, thus, a description thereof may not be repeated.

Embodiment 1

In this embodiment, an information system will be described in which a server apparatus receives a terminal request constructed from an instruction or the like from a user at a terminal apparatus, performs processing using the terminal request, constructs a scenario using the processing result and scenario base information acquired using the terminal request, and transmits the scenario to the terminal apparatus. The terminal apparatus interprets the scenario, drives a driver, and causes hardware to operate.

Furthermore, in this embodiment, an information system will be described in which terminal requests are accumulated, and a scenario is generated based on a history of two or more terminal requests. That is to say, an information system will be described in which different scenarios are generated according to a history of an instruction from the user.

Furthermore, in this embodiment, an information system will be described in which statistical processing is performed on accumulated terminal requests.

Furthermore, in this embodiment, an information system will be described in which, based on an operation on one terminal apparatus, a server apparatus transmits a command to another terminal apparatus, and the other terminal apparatus executes the command.

Furthermore, in this embodiment, an information system will be described in which two or more terminal apparatuses are managed in a group, and the other terminal apparatus to which a command can be transmitted is limited to those in the group.

FIG. 1 is a conceptual diagram of an information system in this embodiment. The information system includes one or at least two terminal apparatuses 1 and a server apparatus 2.

The terminal apparatuses 1 and the server apparatus 2 can communicate with each other via a network 3 such as the Internet or an intranet. Note that the information system may include two or more server apparatuses 2.

There is no limitation on the terminal apparatus 1, and examples thereof include a so-called personal computer, a mobile terminal such as a so-called smartphone and a mobile phone, a display apparatus disposed on the street, a television apparatus, a navigation apparatus, and the like. The terminal apparatus 1 may be any apparatus that includes one or more pieces of hardware driven by drivers, and can output information.

Figure 2:
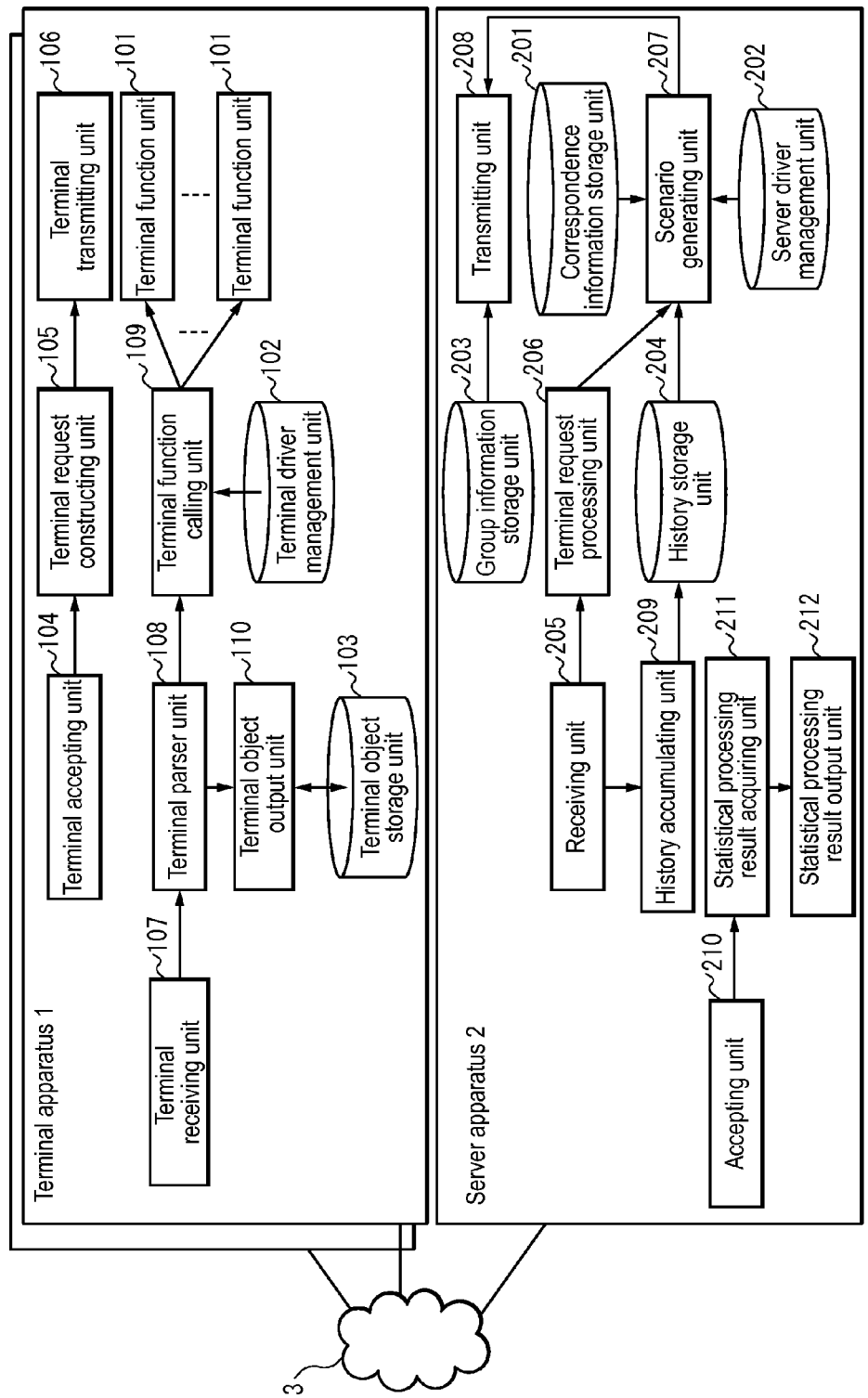
FIG. 2 is a block diagram of the information system in the embodiment.

FIG. 2 is a block diagram of the information system in this embodiment.

The terminal apparatus 1 forming the information system includes terminal function units 101, a terminal driver management unit 102, a terminal object storage unit 103, a terminal accepting unit 104, a terminal request constructing unit 105, a terminal transmitting unit 106, a terminal receiving unit 107, a terminal parser unit 108, a terminal function calling unit 109, and a terminal object output unit 110.

The server apparatus 2 includes a correspondence information storage unit 201, a server driver management unit 202, a group information storage unit 203, a history storage unit 204, a receiving unit 205, a terminal request processing unit 206, a scenario generating unit 207, a transmitting unit 208, a history accumulating unit 209, an accepting unit 210, a statistical processing result acquiring unit 211, and a statistical processing result output unit 212.

Each terminal function unit 101 forming the terminal apparatus 1 is driven by a driver, and realizes a predetermined function. The terminal function unit 101 is typically hardware, and examples thereof include a display screen, a loudspeaker, a camera, a telephone, and the like. Note that the terminal function unit 101 may be software for realizing a mail function and the like.

In the terminal driver management unit 102, one or more driver identifiers each for identifying the driver of each of the one or more terminal function units 101 can be stored.

In the terminal object storage unit 103, one or more objects can be stored. An object may be considered as data or information. The object is, for example, information on an animation character. The object may be formed by integrating data or information, and a program or a script, etc. for processing the data or the like. The object in the terminal object storage unit 103 is typically an object received from the server apparatus 2.

The terminal accepting unit 104 accepts one or more instructions from the user. An instruction may or may not contain data. The instruction may be considered as an operation. The accepting is a concept that encompasses accepting information input from an input device such as a keyboard, a mouse, or a touch panel, receiving information transmitted via a wired or wireless communication line, and accepting information read from a storage medium such as an optical disk, a magnetic disk, or a semiconductor memory.

The instruction may be input by any input part such as a touch panel, a keyboard, a mouse, or a menu screen. The terminal accepting unit 104 may be realized by a device driver for an input part such as a touch panel or a keyboard, control software for a menu screen, or the like.

The terminal request constructing unit 105 constructs a terminal request, which is a request corresponding to one or more instructions. The terminal request constructing unit 105 constructs a terminal request typically using the one or more instructions accepted by the terminal accepting unit

104. The terminal request typically has an identifier of an object on which the instruction is given, but may not have the identifier of the object. The terminal request has, for example, an identifier of an object on which the instruction is given, and instruction content information indicating a content of the instruction. The instruction content information is coordinate information indicating a position on which the instruction is given, a region identifier specifying a region on which the instruction is given, an operation type identifier indicating the type of operation, coordinate information or a region identifier indicating the position or the region, or the like. The operation type identifier is information for identifying an operation such as drag, double click, click, or touch. The terminal request typically contains terminal unique information, which is information unique to the terminal apparatus 1. The terminal unique information may be, for example, static unique information that does not change from terminal apparatus 1 to terminal apparatus 1, and dynamic unique information that dynamically changes. The static unique information is, for example, a terminal identifier, which is an identifier of the terminal apparatus 1, an identifier of the user of the terminal apparatus 1, or the like. The dynamic unique information is, for example, terminal position information indicating the position of the terminal apparatus 1, weather information indicating the weather at a location where the terminal apparatus 1 is located, current time, or the like.

For example, when the user gives an instruction on a screen, the terminal request constructing unit 105 acquires an object identifier of an object that is being displayed, the object identifier being held by the terminal apparatus 1. The terminal request constructing unit 105 acquires an operation type identifier from one or more pieces of coordinate information indicating the position on the screen on which the user gave the instruction. The terminal request constructing unit 105 constructs a terminal request having the object identifier, the operation type identifier, and the one or more pieces of coordinate information.

When the terminal accepting unit 104 accepts voice, the terminal request constructing unit 105 may perform voice recognition on the voice, thereby acquiring a character string. The terminal request constructing unit 105 may construct a terminal request containing the character string. When the terminal accepting unit 104 accepts a sentence in one language, the terminal request constructing unit 105 may perform machine translation on the sentence into another language, and construct a terminal request containing the machine translation result. That is to say, the terminal request constructing unit 105 may perform processing such as voice recognition or machine translation on the one or more instructions accepted by the terminal accepting unit 104.

Furthermore, when the terminal accepting unit 104 accepts voice, the terminal request constructing unit 105 may perform sampling of the voice to obtain digitalized data, and construct a terminal request.

Furthermore, the identifier of the terminal function unit 101 or the driver identifier of the driver that operates according to the instruction or the like accepted by the terminal accepting unit 104 may be acquired by the terminal request constructing unit 105 and contained in the terminal request. Furthermore, the identifier of software that operates according to the instruction or the like accepted by the terminal accepting unit 104 may be acquired by the terminal request constructing unit 105 and contained in the terminal request.

There is no limitation on the data structure of the terminal request constructed by the terminal request constructing unit 105. Also, there is no limitation on the data structure of other data used in the information system.

The terminal transmitting unit 106 transmits the terminal request constructed by the terminal request constructing unit 105, to the server apparatus 2. In order to transmit the terminal request to the server apparatus 2, the terminal transmitting unit 106 holds a server apparatus identifier for identifying the server apparatus 2. The server apparatus identifier is information necessary to communicate with the server apparatus 2, and example thereof include an IP address or a MAC address of the server apparatus 2, a mail address at which the server apparatus 2 can acquire information, or the like.

The terminal receiving unit 107 receives a scenario from the server apparatus 2, in response to the transmission of the terminal request. The scenario has a command to cause a driver of the terminal apparatus 1 to operate. The scenario typically has the command and data. The scenario has, for example, an operation instruction on the terminal function unit 101, an operation command, which is a command indicating an operation of an object that is being displayed, or the like. The operation instruction on the terminal function unit 101 contains, for example, a driver identifier, and data that is to be given to a driver. The scenario has one or at least two commands, or the like. The commands or the like are commands, data, commands and data, or the like.

The terminal parser unit 108 interprets the scenario, thereby acquiring one or more driver identifiers, and data. The data is data that is to be given to the one or more terminal function units 101 identified with the one or more driver identifiers, the data being contained in the scenario. The data may be an object.

Furthermore, the terminal parser unit 108 may interpret the scenario, thereby acquiring an operation command from the scenario.

The terminal function calling unit 109 gives the data acquired by the terminal parser unit 108, to the one or more terminal function units 101 identified with the one or more driver identifiers acquired by the terminal parser unit 108, thereby calling the one or more terminal function units 101. The calling may be considered as causing the units to operate.

The terminal object output unit 110 outputs one or more objects. An object is typically data received from the server apparatus 2. The output is a concept that encompasses displaying on a display screen, projection using a projector, printing with a printer, output of a sound, transmission to an external apparatus, accumulation in a storage medium, delivery of a processing result to another processing apparatus or another program, and the like. That is to say, the terminal object output unit 110 may display the object on a display screen, or may accumulate the object in the terminal object storage unit 103.

Furthermore, the terminal object output unit 110 causes an object corresponding to the operation command to operate according to the operation command. The operation result is typically displayed on a display screen. Note that the terminal object output unit 110 may output the operation result as voice or sound using a loudspeaker, may output the operation result by turning lights on or off using LEDs or the like, or may notify the operation result in other various ways through mechanical operations or the like.

In the correspondence information storage unit 201 forming the server apparatus 2, one or more pieces of correspondence information can be stored. The correspondence information is information indicating the correspondence between the information forming the terminal request and the scenario base information. The scenario base information is information based on which a scenario is to be constructed. The information indicating the correspondence may be information itself. That is to say, the correspondence information may be information having the information forming the terminal request and the scenario base information, information having a pointer to the information forming the terminal request and a pointer to the scenario base information, or the like. The scenario base information may be a command string containing one or more commands, or may be a program or the like.

In the server driver management unit 202, one or more driver identifiers can be stored. The driver identifiers are information for identifying drivers of the terminal function units 101 included in the terminal apparatus 1. Each driver identifier is, for example, a driver name, a physical address of a driver on the disk, or the like. In the server driver management unit 202, one or more driver identifiers are preferably stored for each terminal apparatus or for each type of terminal apparatus.

In the group information storage unit 203, group information can be stored. The group information is information specifying a group of two or more terminal apparatuses 1. The group information has two or more terminal identifiers each for identifying each of two or more terminal apparatuses 1.

In the history storage unit 204, request histories can be stored. The request history is part or the whole of the terminal requests received by the receiving unit 205. In the history storage unit 204, a request history is preferably stored for each terminal apparatus 1. In the history storage unit 204, a request history may be stored for each terminal function unit 101 of the terminal apparatus 1. Each terminal function unit 101 in this case is the same as each driver identifier. In the history storage unit 204, a request history may be stored for each terminal apparatus 1, in units of software operated on the terminal apparatus 1. "In units of software" means a state of being associated with an identifier of software.

The receiving unit 205 receives a terminal request from the terminal apparatus 1.

The terminal request processing unit 206 interprets the terminal request received by the receiving unit 205. The terminal request processing unit 206 acquires scenario base information corresponding to the terminal request, from the correspondence information storage unit 201. The terminal request processing unit 206 performs processing corresponding to the terminal request, and acquires the processing result. The processing may be any processing, such as search processing in an unshown database, machine translation processing on a character string contained in the terminal request, or the like.

If the terminal request contains voice, for example, the terminal request processing unit 206 may perform voice recognition on the voice, thereby acquiring a character string. Then, the terminal request processing unit 206 may acquire scenario base information from the correspondence information storage unit 201, using the character string.

The scenario generating unit 207 generates a scenario, using the scenario base information acquired by the terminal request processing unit 206 and the processing result obtained by the processing performed by the terminal request processing unit 206.

The scenario generating unit 207 generates a scenario, using the terminal request received by the receiving unit 205 and the request histories stored in the history storage unit 204. That is to say, it is preferable that different scenarios are generated if request histories are different, even if the terminal request is the same. For example, it is preferable that different operations are performed according to the status in which a character has been touched.

The scenario generating unit 207 generates different scenarios according to the one or more driver identifiers stored in the server driver management unit 202. "To generate different scenarios" is, for example, to generate a scenario such that it does not contain a driver identifier of a driver not contained in the terminal apparatus 1. It is preferable that the terminal request processing unit 206 of the server apparatus 2 performs processing for the driver not contained in the terminal apparatus 1.

The transmitting unit 208 transmits the scenario generated by the scenario generating unit 207, to the terminal apparatus 1. The transmitting unit 208 may transmit commands or scenarios to another terminal apparatus. The other terminal apparatus preferably has a configuration similar to that of the terminal apparatus 1, but may be any apparatus as long as it can receive a command and perform an operation according to the command. The identifier of the other terminal apparatus to which the commands or scenarios are transmitted may be stored in advance, may be received from the terminal apparatus 1, or may be specified by the other terminal apparatus transmitting information indicating that this terminal apparatus is paired with the terminal apparatus 1. The information indicating that the terminal apparatus is paired with the terminal apparatus 1 is, for example, the user identifier for identifying the user of the terminal apparatus 1.

Note that the transmitting unit 208 preferably transmits no command to the terminal apparatus 1 corresponding to none of the two or more terminal identifiers contained in the group information.

The history accumulating unit 209 accumulates the request history, which is part or the whole of the terminal requests received by the receiving unit 205, in the history storage unit 204. It is assumed that the part of the terminal request includes information generated from the two or more terminal requests. The history accumulating unit 209 may accumulate the request history in the history storage unit 204, for each identifier of the terminal function unit 101 or each driver identifier of the driver contained in the terminal request. The history accumulating unit 209 may accumulate the request history in the history storage unit 204, for each identifier of software contained in the terminal request. The history accumulating unit 209 may accumulate the request history in the history storage unit 204, for each identifier of the terminal function unit 101 or each driver identifier contained in the scenario generated by the scenario generating unit 207. The history accumulating unit 209 may accumulate the request history in the history storage unit 204, for each identifier of software contained in the scenario generated by the scenario generating unit 207.

The accepting unit 210 accepts an instruction, data, and the like from the user of the server apparatus 2. The instruction, the data, and the like may be input by any input part such as a keyboard, a mouse, or a menu screen. The accepting unit 210 may be realized by a device driver for an input part such as a keyboard, control software for a menu screen, or the like.

The statistical processing result acquiring unit 211 performs statistical processing on the request histories, thereby acquiring a statistical processing result. The statistical processing is, for example, processing that acquires an average value, processing that acquires the number of operations per unit time, or the like. There is no limitation on the content of the statistical processing.

The statistical processing result output unit 212 outputs the statistical processing result acquired by the statistical processing result acquiring unit 211.

The terminal driver management unit 102, the terminal object storage unit 103, the correspondence information storage unit 201, the server driver management unit 202, the group information storage unit 203, and the history storage unit 204 are preferably a non-volatile storage medium, but may be realized also by a volatile storage medium.

There is no limitation on the procedure in which the driver identifier and the like are stored in the terminal driver management unit 102 and the like. For example, the driver identifier and the like may be stored in the terminal driver management unit 102 and the like via a storage medium, the driver identifier and the like transmitted via a communication line or the like may be stored in the terminal driver management unit 102 and the like, or the driver identifier and the like input via an input device may be stored in the terminal driver management unit 102 and the like.

The terminal transmitting unit 106, the terminal receiving unit 107, the receiving unit 205, and the transmitting unit 208 are realized typically by a wireless or wired communication part, but may be realized also by a broadcasting part.

The terminal parser unit 108, the terminal function calling unit 109, the terminal request processing unit 206, the scenario generating unit 207, the history accumulating unit 209, and the statistical processing result acquiring unit 211 may be realized typically by an MPU, a memory, or the like. Typically, the processing procedure of the terminal parser unit 108 is realized by software, and the software is stored in a storage medium such as a ROM. Note that the processing procedure may be realized also by hardware (a dedicated circuit).

The terminal object output unit 110 and the statistical processing result output unit 212 may be considered to include or not to include an output device such as a display screen or a loudspeaker. The terminal object output unit 110 may be realized, for example, by driver software for an output device, a combination of driver software for an output device and the output device, or the like.

Next, an operation of the information system will be described. First, an operation of the terminal apparatus 1 will be described with reference to the flowchart in FIG. 3.

(Step S301) The terminal accepting unit 104 judges whether or not an instruction, data or the like has been accepted from the user or the like. If an instruction or the like has been accepted, the procedure advances to step S302, and, if not, the procedure returns to step S301.

(Step S302) The terminal request constructing unit 105 judges whether or not to construct a terminal request using the instruction or the like accepted in step S301. If it is judged to construct a terminal request, the procedure advances to step S303, and, if not, the procedure advances to step S311. In the terminal request constructing unit 105, for example, an event, an instruction, a condition, or the like for constructing a terminal request is stored in advance, and whether or not to construct a terminal request is judged according to whether or not the instruction or the like accepted in step S301 matches the stored event, instruction, condition, or the like. In the terminal request constructing unit 105, for example, an event, an instruction, a condition, or the like not for constructing a terminal request is stored in advance, and it is judged to construct a terminal request if the instruction or the like accepted in step S301 does not match the stored event, instruction, or the like. The condition is, for example, that there is no input for N seconds (N is a numerical value larger than 0), that N seconds has elapsed after predetermined input, or the like. In step S302, the terminal request constructing unit 105 may wait for the condition to be met.

(Step S303) The terminal request constructing unit 105 constructs a terminal request using the instruction or the like accepted in step S301, or the instruction or the like accepted in step S301 and temporarily stored instructions or the like. Note that the processing that constructs a terminal request will be described later with reference to the flowchart in FIG. 4.

(Step S304) The terminal transmitting unit 106 transmits the terminal request constructed in step S303, to the server apparatus 2. The terminal transmitting unit 106 holds, for example, the IP address of the server apparatus 2.

(Step S305) The terminal receiving unit 107 judges whether or not a scenario has been received from the server apparatus 2. If a scenario has been received, the procedure advances to step S306, and, if not, the procedure returns to step S305.

(Step S306) The terminal parser unit 108 interprets the scenario received in step S305, thereby acquiring one or more driver identifiers, and data. It is assumed that the scenario contains a command to operate one or more drivers.

(Step S307) The terminal function calling unit 109 substitutes 1 for a counter i.

(Step S308) The terminal function calling unit 109 judges whether or not there is information regarding an operation of an i-th driver among the information acquired in step S306. If there is information regarding an operation of an i-th driver, the procedure advances to step S309, and, if not, the procedure returns to step S301.

(Step S309) The terminal function calling unit 109 causes the i-th driver to operate according to the information regarding the operation of the i-th driver among the information acquired in step S306.

(Step S310) The terminal function calling unit 109 increments the counter i by 1. The procedure returns to step S308.

(Step S311) The terminal transmitting unit 106 causes the instruction or the like to be temporarily stored in a buffer. The procedure returns to step S301.

Note that, although the terminal transmitting unit 106 in step S302 judges whether or not to construct a terminal request using the instruction or the like accepted in step S301, a terminal request may be always constructed if the instruction or the like has been accepted.

Figure 3:
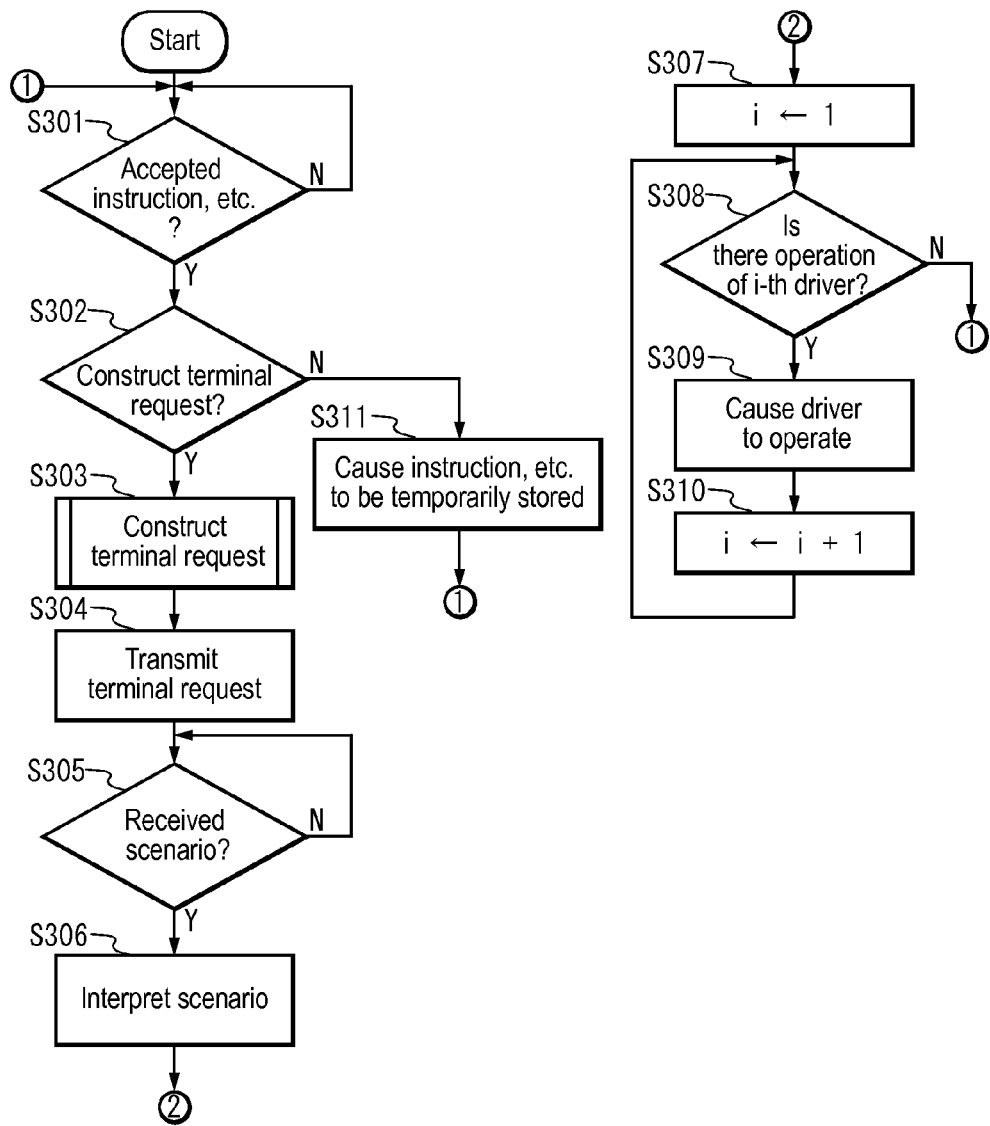
FIG. 3 is a flowchart illustrating an operation of a terminal apparatus 1 in the embodiment.

In the flowchart in FIG. 3, in the scenario, processing other than the processing that causes the driver to operate may be described. In this case, the terminal apparatus 1 performs an operation according to the scenario.

Note that the procedure is terminated by powering off or an interruption at completion of the process in the flowchart in FIG. 3.

Figure 4:
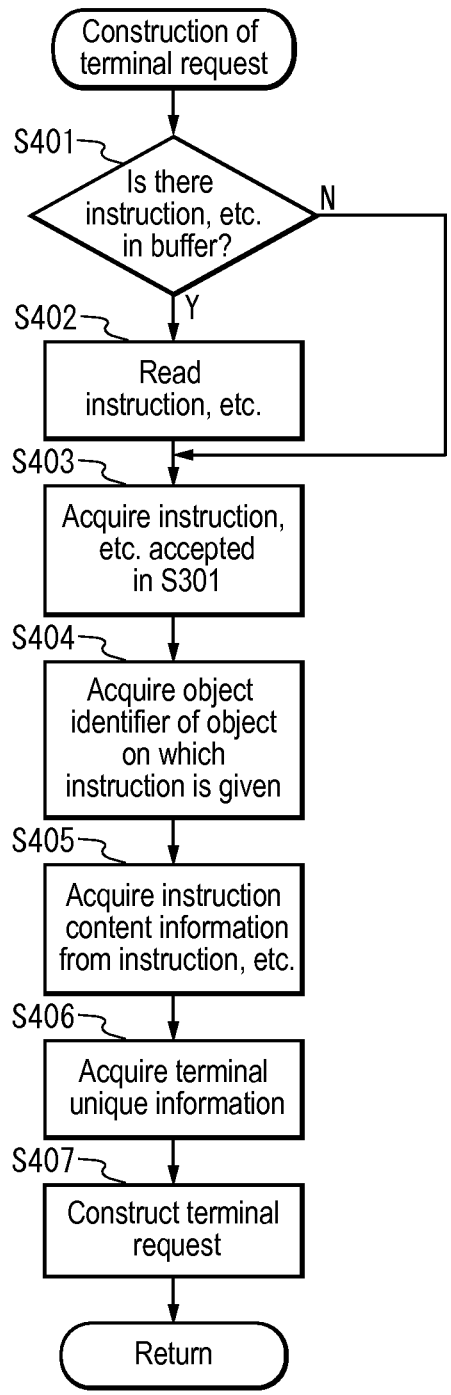
FIG. 4 is a flowchart illustrating processing that constructs a terminal request in the embodiment.

Next, the processing that constructs a terminal request in step S303 will be described with reference to the flowchart in FIG. 4.

(Step S401) The terminal request constructing unit 105 judges whether or not there is an instruction or the like in the buffer. If there is an instruction or the like in the buffer, the procedure advances to step S402, and, if not, the procedure advances to step S403.

(Step S402) The terminal request constructing unit 105 reads the instruction or the like from the buffer.

(Step S403) The terminal request constructing unit 105 acquires the instruction or the like accepted in step S301.

(Step S404) The terminal request constructing unit 105 acquires an object identifier of an object on which the instruction is given, using the instruction or the like acquired in step S403, or the instruction or the like acquired in step S403 and the instruction or the like read in step S402. The instruction or the like refers to coordinate values (x, y) on a screen, and the terminal request constructing unit 105 holds an object identifier of an object that is currently being displayed on the screen and a display position of the object (e.g., set of coordinate values specifying the contour of the object), and acquires an object identifier corresponding to the coordinate values indicated by the instruction or the like. Such a technique is known as object management techniques, and, thus, a detailed description thereof has been omitted. For example, when a certain character is displayed on a screen, the terminal request constructing unit 105 acquires an object identifier of the touched character.

(Step S405) The terminal request constructing unit 105 acquires instruction content information, using the instruction or the like acquired in step S403, or the instruction or the like acquired in step S403 and the instruction or the like read in step S402. The instruction content information is, for example, that a touch has been performed, that a drag has been performed, a region identifier indicating the region of the touched character, or the like. For example, it is assumed that the terminal request constructing unit 105 holds a region identifier of an object that is currently being displayed on the screen and positional information specifying the region (set of coordinate values indicating the contour of the region).

(Step S406) The terminal request constructing unit 105 acquires terminal unique information. The terminal unique information is, for example, positional information acquired by a GPS receiver, current time, terminal identifier, or the like.

(Step S407) The terminal request constructing unit 105 constructs a terminal request having the object identifier, the instruction content information, and the terminal unique information. Note that the terminal request constructing unit 105 may construct a terminal request only from one or two pieces of information from among the object identifier, the instruction content information, and the terminal unique information. The procedure returns to the upper-level processing.

Above, an example of a method for constructing a terminal request was described with reference to the flowchart in FIG. 4. It is sufficient that the terminal request constructing unit 105 constructs a terminal request from an accepted instruction or the like, and there is no limitation on the method.

For example, the terminal request constructing unit 105 may perform voice recognition on accepted voice, thereby acquiring a character string. Then, the terminal request constructing unit 105 may construct a terminal request from the character string and terminal unique information such as the terminal identifier.

Next, an operation of the server apparatus 2 will be described with reference to the flowchart in FIG. 5.

(Step S501) The receiving unit 205 judges whether or not a terminal request has been received from the terminal apparatus 1. If a terminal request has been received, the procedure advances to step S502, and, if not, the procedure advances to step S508.

(Step S502) The terminal request processing unit 206 interprets the terminal request received by the receiving unit 205. The terminal request processing unit 206 acquires scenario base information corresponding to the terminal request, from the correspondence information storage unit 201.

(Step S503) The terminal request processing unit 206 judges whether or not there is processing that is to be performed by the server apparatus 2, using an interpretation result of the terminal request. If there is processing that is to be performed by the server apparatus 2, the procedure advances to step S504, and, if not, the procedure advances to step S505. For example, the terminal request processing unit 206 judges that there is processing that is to be performed by the server apparatus 2, if the terminal request contains a variable or if the scenario base information contains a variable.

(Step S504) The terminal request processing unit 206 performs processing that is specified by the terminal request and that is to be performed by the server apparatus 2. The terminal request processing unit 206 acquires the processing result.

(Step S505) The scenario generating unit 207 constructs a scenario, using the scenario base information acquired in step S502, or the scenario base information acquired in step S502 and the processing result acquired in step S504.

(Step S506) The transmitting unit 208 transmits the scenario constructed in step S505, to the terminal apparatus 1.

(Step S507) The history accumulating unit 209 accumulates the whole or part of the terminal request received in step S501, in the history storage unit 204. The procedure returns to step S501. The part of the terminal request is considered to include information constructed from one or more terminal requests (e.g., affinity level, which will be described later).

(Step S508) The accepting unit 210 judges whether or not an instruction to perform statistical processing has been accepted. If such an instruction has been accepted, the procedure advances to step S509, and, if not, the procedure returns to step S501. Hereinafter, such an instruction is referred to as a statistical processing instruction as appropriate.

(Step S509) The statistical processing result acquiring unit 211 performs statistical processing using the one or at least two terminal requests in the history storage unit 204. The statistical processing result acquiring unit 211 acquires a statistical processing result.

(Step S510) The statistical processing result output unit 212 outputs the statistical processing result acquired in step S509. The procedure returns to step S501.

Figure 5:
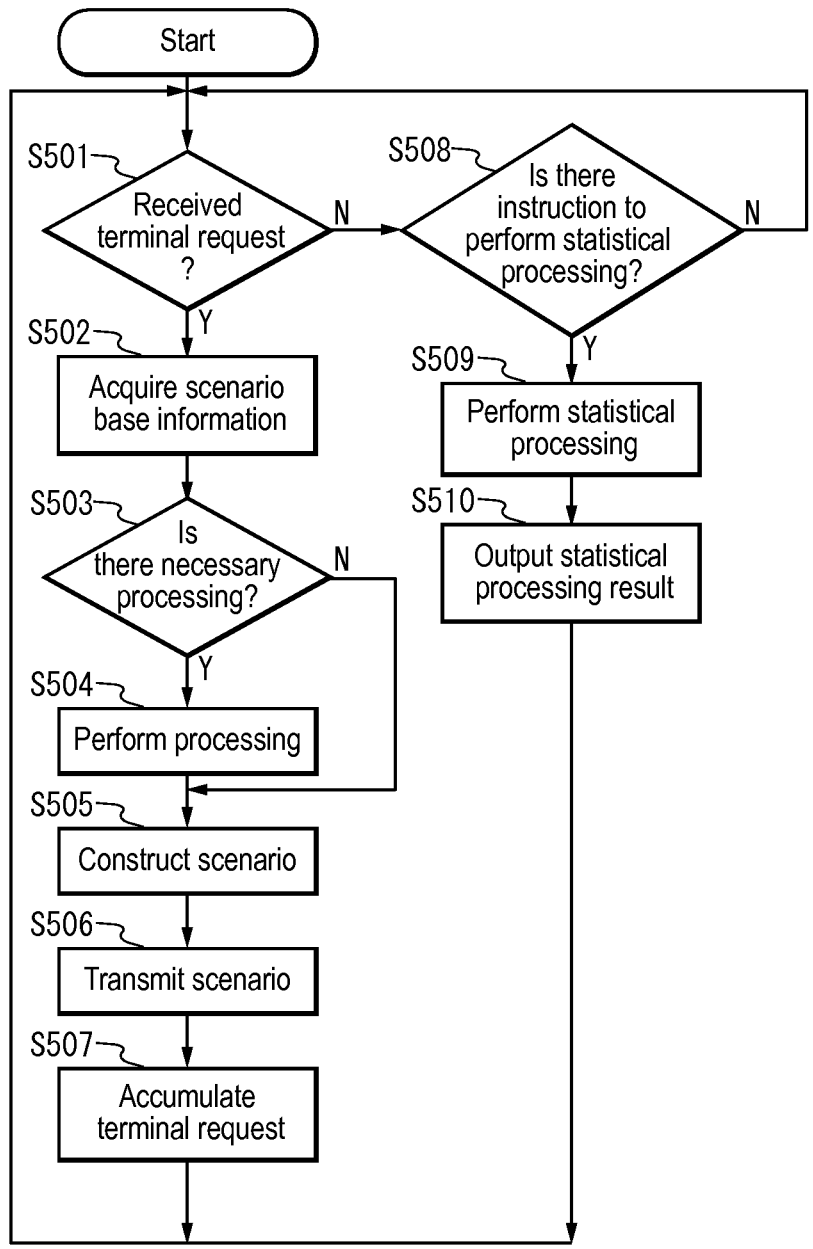
FIG. 5 is a flowchart illustrating an operation of a server apparatus 2 in the embodiment.

It will be appreciated that, in the flowchart in FIG. 5, there is no limitation on the order of processing that can be performed independently of the other processing, such as the processing in step S507.

Note that the procedure is terminated by powering off or an interruption at completion of the process in the flowchart in FIG. 5.

Hereinafter, a specific operation of the information system in this embodiment will be described. A conceptual diagram of the information system is shown in FIG. 1.

FIG. 6 shows an exemplary terminal driver management table stored in the terminal driver management unit 102 of the terminal apparatus 1. This terminal driver management table manages information on drivers included in one terminal apparatus 1. In the terminal driver management table, one or more records each having "ID", "driver identifier", and "driver calling function" are stored. "ID" is information for identifying a record of the terminal driver management table. "Driver identifier" is information for identifying a driver. "Driver calling function" is a function for causing a driver to operate. Instead of the "driver calling function", it is possible to use a message for causing a driver to operate, a method name, information on a pointer to call a driver, or the like. That is to say, the record of the terminal driver management table may be any record as long as it is information for causing a driver to operate. A driver calling function "show_char( )" is an example of a function to call a driver that displays a character or the like, "voice( )" is an example of a function to call a driver that reproduces voice, "ui( )" is an example of a function to call a driver that handles a user interface, "camera( )" is an example of a function to call a driver of a camera, "tel( )" is an example of a function to call a driver of a telephone, "mail( )" is an example of a function to call a driver of a mail, and "data_manage( )" is an example of a function to call a driver that manages data.

FIG. 7 shows an exemplary terminal object management table stored in the terminal object storage unit 103 of the terminal apparatus 1. In the terminal object management table, one or more records each having "ID", "character", "entire region information", "part information", and "display flag" are stored. "ID" is a character identifier. "Entire region information" is information indicating a region on a screen on which a character is displayed. "Entire region information" typically has two or more pieces of coordinate information. The coordinate information is typically coordinate information on a screen. "Part information" is information regarding part of a character. The part is a face, breasts, a belly, hands, legs, or the like. "Part information" has "part identifier" and "partial region information". "Part identifier" is an ID for identifying part, where, for example, the breasts are denoted by "1" and the face is denoted by "2". "Partial region information" is information indicating a region of part of a character, and typically has two or more pieces of coordinate information. The coordinate information may be coordinate information on a screen, information on relative coordinates in a character, or the like. "Display flag" is information indicating whether or not a character is currently being displayed. In this example, a character corresponding to a record having "display flag=1" is currently being displayed on the screen of the terminal apparatus 1, and a character corresponding to a record having "display flag=0" is not currently being displayed on the screen of the terminal apparatus 1.

FIG. 8 shows a correspondence information management table stored in the correspondence information storage unit 201 of the server apparatus 2. In the correspondence information management table, one or more records each having "ID", "terminal request", and "scenario base information" are stored. "ID" is information for identifying a record of the correspondence information management table. "Terminal request" is information indicating a terminal request. "Scenario base information" is scenario base information corresponding to a terminal request. "Scenario base information" in this example is a command, or a command with control information, but there is no limitation on the structure or content thereof. In this example, the command is, for example, in the form of a function. The control information is, for example, "if then else", or the like. In FIG. 8, "get_char($ user identifier, $ character)" is a function to acquire information regarding a character that is currently being displayed on the terminal apparatus 1 of the user identified with the user identifier, "delete($ user identifier, $ character)" is a scenario corresponding to a command to cancel the display of a character from (set a character so as not to be displayed on) the terminal apparatus 1 of the user identified with the user identifier, "put_char($ terminal identifier, ch)" is a scenario corresponding to a command to transmit information regarding a character stored in the variable "ch", to the terminal apparatus 1 identified with the terminal identifier, "search($ terminal identifier, $ person)" is a function to search for a terminal identifier of a user having the relationship "$ person" with the user of the terminal apparatus 1 identified with the terminal identifier, "put($ positional information, terminal)" is a scenario to transmit positional information to the terminal apparatus 1 specified with terminal, "start_up(navi( ))" is a scenario to start the navigation system of the terminal apparatus 1, "set_destination($ positional information)" is a scenario to set a destination position in the navigation system of the terminal apparatus 1, "route_search($ current position, $ destination position)" is a scenario to perform a route search taking the current position as a start point and the destination position as an end point, and "send_message( )" is a scenario to transmit a message in the argument and prompt the terminal apparatus 1 to output the message. It will be appreciated that these scenarios and functions are merely examples.

FIG. 9 shows an exemplary server driver management table stored in the server driver management unit 202 of the server apparatus 2. This server driver management table manages information on drivers included in each terminal apparatus 1. In the server driver management table, one or more records each having "ID", "terminal identifier", and "driver identifier" are stored. "ID" is information for identifying a record. "Terminal identifier" is information for identifying a terminal apparatus. "Driver identifier" is information for identifying a driver. That is to say, the server driver management table manages drivers included in one or more terminal apparatuses 1.

FIG. 10 shows a group information management table stored in the group information storage unit 203 of the server apparatus 2. In the group information management table, one or more records each having "group ID" and "terminal identifier" are stored. "Group ID" is information for identifying a group. "Terminal identifier" is an identifier of a terminal apparatus belonging to a group specified with a group ID. The attribute value "terminal identifier" has two or more terminal identifiers. It is assumed that, when the server apparatus 2 uses the group information management table, only terminal apparatuses belonging to the same group as a terminal apparatus from which the terminal request was transmitted can be subjected to control based on the terminal request.

FIG. 11 shows an exemplary history management table stored in the history storage unit 204 of the server apparatus 2. In the history management table, one or more records each having "ID", "terminal identifier", "request history", and "affinity level" are stored. In "request history", a history of one or more terminal requests transmitted from the terminal apparatus 1 identified with the terminal identifier is stored. "Affinity level" is information constructed from a request history, and is the degree how much a character likes the user of the terminal apparatus 1. For example, if one or more terminal requests are received indicating that the breasts or the belly of the character has been touched a threshold number of times or more, the terminal request processing unit 206 decreases the value of the corresponding affinity level. For example, if one or more terminal requests are received indicating that the head or the face of the character has been touched a threshold number of times or more, the terminal request processing unit 206 increases the value of the corresponding affinity level. If no terminal request indicating a touch has been received for N minutes or more (N is a positive numerical value), the terminal request processing unit 206 returns the corresponding affinity level to an initial value (e.g., "high"). Note that the affinity level "high", "middle", and "low" respectively correspond, for example, to numerical values "1", "2", and "3". The processing that changes the affinity level is performed, for example, by the terminal request processing unit 206.

FIG. 12 shows a related user management table held by the terminal request processing unit 206. The related user management table is a table for managing a person related to the user who possesses the terminal apparatus 1, in association with their relationship. In FIG. 12, one or more records each having "ID", "terminal identifier 1", "relationship", and "terminal identifier 2" are stored. "Terminal identifier 1" is a terminal identifier, and is an identifier of a terminal possessed by a first user. "Terminal identifier 2" is a terminal identifier, and is an identifier of a terminal possessed by a second user. "Relationship" is information indicating a relationship between the first user and the second user. The record with "ID=1" in the related user management table indicates that a grandmother of the user with the terminal identifier "101" is the user with the terminal identifier "103".

Figure 13:
FIG. 13 is a view showing a character display example on the terminal apparatus 1 in the embodiment.

As shown in FIG. 13, the terminal apparatus 1 currently displays a character corresponding to "ID=1". Hereinafter, a specific operation of the information system in this embodiment, which will be performed in this status, will be described by way of four examples.

Specific Example 1

In Specific Example 1, an example will be described in which the server apparatus 2 interprets a command input to the terminal apparatus 1, and causes a driver of the terminal apparatus 1 to operate. More specifically, processing will be described in which, when the sound output from the terminal apparatus 1 is too weak, the user of the terminal apparatus 1 gives an instruction to "increase volume by 3", and the volume is increased by 3 in response to a command from the server apparatus 2.

First, it is assumed that the user of the terminal apparatus 1 identified with the terminal apparatus identifier "101" gives an instruction by voice to "increase volume by 3", to his/her own terminal apparatus 1.

Next, the terminal accepting unit 104 of the terminal apparatus 1 accepts the voice "increase volume by 3". Next, the terminal request constructing unit 105 detects a break in the voice accepted by the terminal accepting unit 104, and judges to construct a terminal request, using the instruction or the like accepted by the terminal accepting unit 104.

Next, the terminal request constructing unit 105 performs voice recognition on the voice "increase volume by 3", thereby acquiring a character string "increase volume by 3". The terminal request constructing unit 105 acquires a terminal identifier "101" stored in the terminal apparatus 1. There is no limitation on the area in which the terminal identifier "101" is stored. The terminal request constructing unit 105 acquires positional information (Xa, Ya) acquired by the GPS receiver included in the terminal apparatus 1. The GPS receiver is, for example, one of the terminal function units 101. The terminal request constructing unit 105 acquires a current time "2012/10/27 10:38:51" from an unshown clock or an external apparatus (e.g., NTP server). The terminal request constructing unit 105 constructs a terminal request "101, (Xa, Ya), 2012/10/27 10:38:51, "increase volume by 3"". The terminal identifier "101" is static terminal unique information, and the positional information and the current time are dynamic terminal unique information. The character string "increase volume by 3" corresponds to instruction content information. Note that this terminal request does not have an object identifier of an object on which the instruction is given. This terminal request has "terminal identifier, positional information, current time, instruction content information", but it will be appreciated that the structure of this terminal request is merely an example.

Next, the terminal transmitting unit 106 transmits the constructed terminal request, to the server apparatus 2.

Next, the receiving unit 205 of the server apparatus 2 receives the terminal request "101, (Xa, Ya), 2012/10/27 10:38:51, "increase volume by 3"", from the terminal apparatus 1.

Next, the terminal request processing unit 206 acquires the instruction content information "increase volume by 3", from the received terminal request.

Next, the terminal request processing unit 206 performs a search in the correspondence information management table in FIG. 8, using the instruction content information "increase volume by 3". The terminal request processing unit 206 judges that the instruction content information matches the terminal request ""volume" $ numerical value "increase"" with "ID=2" in the correspondence information management table. The terminal request processing unit 206 acquires the scenario base information "volume_up($ terminal identifier, $ numerical value)" with "ID=2" in the correspondence information management table.

Next, the terminal request processing unit 206 detects that there is a variable in the terminal request ""volume" $ numerical value "increase"", and judges that there is processing that is to be performed by the server apparatus 2. The processing that is to be performed by the server apparatus 2 is processing that acquires a variable "$ numerical value".

Next, the terminal request processing unit 206 acquires "3" corresponding to the variable "$ numerical value", using the instruction content information "increase volume by 3" and the terminal request ""volume" $ numerical value "increase"", from the instruction content information.

Next, the scenario generating unit 207 acquires the terminal identifier "101" from the terminal request. The scenario generating unit 207 obtains "3" corresponding to the variable "$ numerical value" acquired by the terminal request processing unit 206.

The scenario generating unit 207 constructs a scenario "volume_up(101, 3)", using the scenario base information "volume_up($ terminal identifier, $ numerical value)", the terminal identifier "101", and "3" corresponding to the variable "$ numerical value".

Next, the transmitting unit 208 transmits the constructed scenario "volume_up(101, 3)", to the terminal apparatus 1. Note that the transmitting unit 208 holds information on a transmission destination (e.g., IP address) corresponding to the terminal identifier "101", and transmits the scenario to the terminal apparatus 1 using the information on the transmission destination.

Next, the history accumulating unit 209 accumulates the whole or part of the received terminal request "101, (Xa, Ya), 2012/10/27 10:38:51, "increase volume by 3"", in the history storage unit 204. The history accumulating unit 209 may accumulate the scenario "volume_up(101, 3)", in the history storage unit 204. In this case, the part of the terminal request may be a generated scenario.

Next, the terminal receiving unit 107 of the terminal apparatus 1 receives the scenario "volume_up(101, 3)" from the server apparatus 2.

Next, the terminal parser unit 108 interprets the received scenario, thereby acquiring a driver identifier "voice reproduction" and data "volume_up 3". It is assumed that the terminal parser unit 108 holds a correspondence between a function name contained in a scenario and a driver identifier or a function name that is to be given to a driver.

The terminal function calling unit 109 gives an instruction to increase the volume by "3" to the driver identified with the driver identifier "voice reproduction". The voice output from the terminal apparatus 1 after this point is voice whose volume has been increased by "3".

As described above, according to this specific example, the processing by the terminal apparatus 1 is continued in a state where the terminal apparatus 1 and the server apparatus 2 are communicating with each other, and the terminal request transmitted from the terminal apparatus 1 is interpreted by the server apparatus 2. The server apparatus 2 performs at least part of the processing, constructs a scenario, using the processing result and the scenario base information corresponding to the terminal request, and transmits the scenario to the terminal apparatus 1. The terminal apparatus 1 interprets the scenario including driving of a driver included in that terminal apparatus, causes the driver to operate, and performs desired processing.

Specific Example 2

In Specific Example 2, an example will be described in which the server apparatus 2 interprets the terminal request transmitted from the terminal apparatus 1, and causes a driver of the terminal apparatus 1 to operate. In Specific Example 2, an exemplary operation will be described in which different operations can be realized in the terminal apparatus 1 based on a history of user operations at the terminal apparatus 1. More specifically, in Specific Example 2, processing will be described in which, if the user of the terminal apparatus 1 touches the breasts of a character that is being displayed on the terminal apparatus 1 at a level corresponding to a threshold or more, the affinity level with respect to the user of the terminal apparatus 1 is lowered, and an operation of the character becomes different from that in the case where the affinity level is high.

In the history management table in FIG. 11, the affinity level of the character "ID=1" with respect to the user with the terminal identifier "101" is "high". It is assumed that the affinity level is managed among three levels consisting of "high", "middle", and "low". From the history management table in FIG. 11, it is seen that the user with the terminal identifier "101" has touched the character identified with the character identifier "1" on the breasts once and on the face once.

It is assumed that the scenario generating unit 207 holds the character management table shown in FIG. 14, in order to generate a scenario. The character management table has "ID", "character ID", and "data". "Data" has "image" and "voice". "ID" is information for identifying a record. "Character ID" is a character identifier. "Data" is data output by the terminal apparatus 1. "Image" is typically a moving image, but may be a still image.

In this example, it is assumed that the terminal request processing unit 206 lowers the affinity level by one if the breasts or the belly of the character is touched three times or more within three minutes.

It is assumed that, in this status, the user of the terminal apparatus 1 touches the breasts of the character with "character ID=1" on the screen in FIG. 13. The screen in FIG. 13 is a touch panel.

Next, the terminal accepting unit 104 accepts an instruction (e.g., point(xb, yb)) containing the coordinate information indicating the touch on the breasts of the character "1" from the user. The point(xb, yb) is, for example, output from the driver of the touch panel.

Next, the terminal request constructing unit 105 acquires the character identifier (object identifier) "1" corresponding to "display flag=1" in the terminal object management table in FIG. 7.

The terminal request constructing unit 105 judges that a touch has been performed, from the instruction (point(xb, yb)). The terminal request constructing unit 105 detects that the coordinate information (xb, yb) refers to a point inside the region specified with the partial region information "(x101, y101) (x102, y102) . . . " in the record with "ID=1" in the terminal object management table in FIG. 7. The terminal request constructing unit 105 acquires a part identifier "1" paired with this partial region information.

Next, the terminal request constructing unit 105 judges to construct a terminal request, because the part identifier "1" can be acquired from the accepted instruction. Note that the terminal request constructing unit 105 judges to construct a terminal request, if the part identifier managed in the terminal object management table in FIG. 7 can be acquired.

Next, the terminal request constructing unit 105 constructs a terminal request "touch (1, 1)". That is to say, the terminal request constructing unit 105 acquires "touch" from the judgment that a touch has been performed, and obtains arguments (1, 1) of "touch" from the object identifier "1" and the part identifier "1". It is assumed that the terminal request constructing unit 105 holds a function name (example of information forming the terminal request) according to the type of operation (touch (click), double click, drag, etc.) performed by the user on the object.

Furthermore, it is assumed that the terminal request constructing unit 105 has acquired, for example, the terminal identifier "101", the positional information (Xc, Yc), and the current time "2012/10/28 11:38:25". It is assumed that the terminal request constructing unit 105 has constructed a terminal request "touch (1, 1), 101, (Xc, Yc), 2012/10/28 11:38:25" that is to be transmitted, from the terminal request "touch (1, 1)" together with the terminal identifier, the positional information, and the current time.

Next, the terminal transmitting unit 106 transmits the constructed terminal request, to the server apparatus 2.

Next, the receiving unit 205 of the server apparatus 2 receives the terminal request "touch (1, 1), 101, (Xc, Yc), 2012/10/28 11:38:25", from the terminal apparatus 1.

Next, the terminal request processing unit 206 interprets the terminal request received by the receiving unit 205, thereby acquiring "touch (1, 1)". The terminal request processing unit 206 judges that "touch (1, 1)" matches the record with "ID=3" in the correspondence information management table in FIG. 8. The terminal request processing unit 206 obtains "object identifier=1" and "part identifier=1" from "touch (1, 1)". In this case, "touch (1, 1)" has been performed only twice, and, thus, the terminal request processing unit 206 does not change the affinity level "high" in the history management table in FIG. 11.

Next, the scenario generating unit 207 acquires the scenario base information in the record with "ID=3", from the correspondence information management table. The scenario generating unit 207 obtains the affinity level "high" of the terminal identifier "101", from the history management table in FIG. 11, according to the acquired scenario base information. The scenario generating unit 207 interprets the scenario base information, thereby obtaining a description "show_char($ object identifier, ID=2)" corresponding to the affinity level "high" contained in the scenario base information. Next, the scenario generating unit 207 substitutes "1" for the variable "$ object identifier" of "show_char($ object identifier, ID=2)", thereby obtaining "show_char(1, 2)". Next, the scenario generating unit 207 acquires data corresponding to the object identifier "1" and with "ID=2" (data in the record with ID=2), from FIG. 14. This data is the image and the voice data "Oh no" in the record with "ID=2" in FIG. 14. The scenario generating unit 207 acquires the driver identifier "character" corresponding to an image and the driver identifier "voice reproduction" corresponding to voice. The scenario generating unit 207 constructs a scenario "(character, image in record with "ID=2"), (voice reproduction, voice in record with "ID=2")". It is assumed that show_char is a command to output the character at the terminal apparatus, and the scenario generating unit 207 holds information indicating that the driver identifier corresponding to an image is "character" and the driver identifier corresponding to voice is "voice reproduction".

Next, the transmitting unit 208 transmits the constructed scenario, to the terminal apparatus 1. Next, the history accumulating unit 209 accumulates the whole or part of the received terminal request, in the history storage unit 204. In this example, the history accumulating unit 209 accumulates "(1, 1, touch)", which is considered to be part of the terminal request, in the history storage unit 204.

Next, the terminal receiving unit 107 of the terminal apparatus 1 receives the scenario "(character, image in record with "ID=2"), (voice reproduction, voice in record with "ID=2")", from the server apparatus 2.

Next, the terminal parser unit 108 interprets the received scenario, thereby acquiring the driver identifier "character", the image in the record with "ID=2", the driver identifier "voice reproduction", and the voice "Oh no". The terminal parser unit 108 holds a driver calling function corresponding to each driver identifier.

Figure 15:
FIG. 15 is a view showing a character display example on the terminal apparatus 1 in the embodiment.

Next, the terminal function calling unit 109 gives the image in the record with "ID=2" to the driver corresponding to the driver identifier "character", using the driver calling function, and starts the driver. In a similar manner, the terminal function calling unit 109 gives the voice "Oh no" to the driver corresponding to the driver identifier "voice reproduction", and starts the driver. As a result, the character display in FIG. 13 changes as shown in FIG. 15, and the voice "Oh no" is output. Note that the character in FIG. 15 was touched on the breasts, but she is smiling because the affinity level is "high".

Next, it is assumed that, in a similar manner, the user of the terminal apparatus 1 touches the breasts of the character with "character ID=1" on the screen in FIG. 15.

Then, it is assumed that, in a similar manner, the terminal request constructing unit 105 constructs a terminal request "touch (1, 1), 101, (Xd, Yd), 2012/10/28 11:38:48" that is to be transmitted.

Next, the terminal transmitting unit 106 transmits the constructed terminal request, to the server apparatus 2.

Next, the receiving unit 205 of the server apparatus 2 receives the terminal request from the terminal apparatus 1. The terminal request processing unit 206 interprets the terminal request received by the receiving unit 205 in a similar manner. In this case, "touch (1, 1)" has been performed three times, and, thus, the terminal request processing unit 206 changes the affinity level in the history management table in FIG. 11 from "high" to "middle".

Next, the scenario generating unit 207 acquires the scenario base information in the record with "ID=3", from the correspondence information management table. The scenario generating unit 207 obtains the affinity level "middle" of the terminal identifier "101", from the history management table, according to the acquired scenario base information. The scenario generating unit 207 interprets the scenario base information, thereby obtaining a description "show_char($ object identifier, ID=3)" corresponding to the affinity level "middle" contained in the scenario base information. Next, the scenario generating unit 207 substitutes "1" for the variable "$ object identifier" of "show_char($ object identifier, ID=3)", thereby obtaining "show_char(1, 3)". Next, the scenario generating unit 207 acquires data corresponding to the object identifier "1" and with "ID=3" (data in the record with ID=3), from FIG. 14. This data is the image and the voice data "You're naughty" in the record with "ID=3" in FIG. 14. The scenario generating unit 207 acquires the driver identifier "character" corresponding to an image and the driver identifier "voice reproduction" corresponding to voice. The scenario generating unit 207 constructs a scenario "(character, image in record with "ID=3"), (voice reproduction, voice in record with "ID=3")".

Next, the transmitting unit 208 transmits the constructed scenario, to the terminal apparatus 1. Next, the history accumulating unit 209 accumulates the whole or part of the received terminal request, in the history storage unit 204. In this example, the history accumulating unit 209 accumulates "(1, 1, touch)", which is considered to be part of the terminal request, in the history storage unit 204.

Next, the terminal receiving unit 107 of the terminal apparatus 1 receives the scenario "(character, image in record with "ID=3"), (voice reproduction, voice in record with "ID=3")", from the server apparatus 2.

Next, the terminal parser unit 108 interprets the received scenario, thereby acquiring the driver identifier "character", the image in the record with "ID=3", the driver identifier "voice reproduction", and the voice "You're naughty".

Figure 16:
FIG. 16 is a view showing a character display example on the terminal apparatus 1 in the embodiment.

Next, the terminal function calling unit 109 gives the image in the record with "ID=3" to the driver corresponding to the driver identifier "character", and starts the driver. The terminal function calling unit 109 further gives the voice "You're naughty" to the driver corresponding to the driver identifier "voice reproduction", and starts the driver. As a result, the character display in FIG. 15 changes as shown in FIG. 16, and the voice "You're naughty" is output. Note that the character in FIG. 16 was touched on the breasts, but she is just hiding the breasts because the affinity level is "middle".

As described above, according to this specific example, in an information system in which the processing by the terminal apparatus 1 is continued in a state where the terminal apparatus 1 and the server apparatus 2 are communicating with each other, different operations can be realized in the terminal apparatus 1 based on a history of user operations at the terminal apparatus 1.

Specific Example 3

In Specific Example 3, an example will be described in which the server apparatus 2 interprets the terminal request transmitted from the terminal apparatus 1, and causes a driver of a terminal apparatus different from the terminal apparatus 1 from which the terminal request was transmitted, to operate according to a scenario. The scenario is transmitted from the server apparatus 2. More specifically, in Specific Example 3, an exemplary operation will be described in which, based on a user operation at one terminal apparatus, another terminal apparatus can be operated.

It is assumed that, first, the user of the terminal apparatus 1 identified with the terminal apparatus identifier "101" gives an instruction by voice to "bring grandma here", to his/her own terminal apparatus 1.

Next, the terminal accepting unit 104 of the terminal apparatus 1 accepts the voice "bring grandma here". Next, the terminal request constructing unit 105 detects a break in the voice accepted by the terminal accepting unit 104, and judges to construct a terminal request, using the instruction or the like accepted by the terminal accepting unit 104.

Next, the terminal request constructing unit 105 performs voice recognition on the voice "bring grandma here", thereby acquiring a character string "bring grandma here". The terminal request constructing unit 105 acquires a terminal identifier "101" stored in the terminal apparatus 1. The terminal request constructing unit 105 acquires positional information (Xe, Ye) acquired by the GPS receiver included in the terminal apparatus 1. The GPS receiver is, for example, one of the terminal function units 101. The terminal request constructing unit 105 acquires a current time "2012/10/28 13:59:53" from an unshown clock or an external apparatus (e.g., NTP server). The terminal request constructing unit 105 constructs a terminal request "101, (Xe, Ye), 2012/10/28 13:59:53, "bring grandma here"".

Next, the terminal transmitting unit 106 transmits the constructed terminal request, to the server apparatus 2.

Next, the receiving unit 205 of the server apparatus 2 receives the terminal request "101, (Xe, Ye), 2012/10/28 13:59:53, "bring grandma here"", from the terminal apparatus 1.

Next, the terminal request processing unit 206 and the scenario generating unit 207 interpret the terminal request received by the receiving unit 205 as follows. Then, the terminal request processing unit 206 acquires the instruction content information "bring grandma here", from the received terminal request.

Next, the scenario generating unit 207 performs a search in the correspondence information management table in FIG. 8, using the instruction content information "bring grandma here". The scenario generating unit 207 judges that instruction content information matches the terminal request "$ person.* "bring here"" with "ID=5" in the correspondence information management table. The scenario generating unit 207 acquires the scenario base information with "ID=5" in the correspondence information management table.

Next, the scenario generating unit 207 detects that there is a variable in the terminal request "$ person.* "bring here"", and judges that there is processing that is to be performed by the server apparatus 2. The first processing that is to be performed by the server apparatus 2 is processing that acquires a variable "$ person".

Next, the scenario generating unit 207 acquires "grandma" corresponding to the variable "$ person", using the instruction content information "bring grandma here" and the terminal request "$ person.* "bring here"", from the instruction content information. There is no limitation on the method for acquiring "grandma". For example, the scenario generating unit 207 performs morphological analysis on "bring grandma here", thereby acquiring a word "grandma", and judges that this word corresponds to the variable "$ person".

Next, the scenario generating unit 207 interprets the scenario base information with "ID=5" in the correspondence information management table. That is to say, the scenario generating unit 207 substitutes "101" and "grandma" for the variables "$ terminal identifier" and "$ person" of "terminal=search($ terminal identifier, $ person)" of the scenario base information. The scenario generating unit 207 executes "terminal=search(101, grandma)". That is to say, the scenario generating unit 207 acquires a terminal identifier 2 "103", from the record matching "terminal identifier 1=101" and "relationship=grandma" in the related user management table in FIG. 12. That is to say, "terminal" of "terminal=search(101, grandma)" is acquired as "103".

Next, the scenario generating unit 207 interprets the scenario base information, thereby judging that there is a match with "terminal !=NULL". The scenario generating unit 207 acquires scenario base information corresponding to "terminal !=NULL", from the record with "ID=5" in FIG. 8. This scenario base information is "put($ positional information, terminal); start_up(navi( )); set_destination($ positional information); route_search($ current position, $ destination position);".

Next, the scenario generating unit 207 substitutes "positional information=(Xe, Ye)" and "terminal=103" for "put($ positional information, terminal)", thereby constructing "put ((Xe, Ye), 103)".

Next, the transmitting unit 208 checks whether or not the terminal identifier "101" and the terminal identifier "103" of the grandma's terminal apparatus are managed in a group in the group information storage unit 203. In the group information management table in FIG. 10, "101" and "103" are managed in a group. Accordingly, the transmitting unit 208 judges that a command such as "put((Xe, Ye), 103)" may be transmitted to the grandma's terminal apparatus 1. The transmitting unit 208 transmits "put((Xe, Ye), 103)", to the terminal apparatus 1 with "103". Note that "put((Xe, Ye), 103)" is a command to give notice of the positional information (Xe, Ye) of the terminal apparatus 1.

The positional information (Xe, Ye) of the grandchild's terminal apparatus 1 (the terminal apparatus 1 from which the terminal request was transmitted) is received and temporarily stored by the grandma's terminal apparatus 1. Note that guide processing described below is preferably performed also in the case where information for asking whether or not guide processing is permitted to be performed is output to the grandma's terminal apparatus 1, and information indicating "permission" is received from the grandma's terminal apparatus 1.

Next, the transmitting unit 208 transmits the command "start_up(navi( ));", to the terminal apparatus 1 with "103".

Next, the grandma's terminal apparatus 1 receives the command "start_up(navi( ));", and starts navi( ) according to the command. That is to say, in the grandma's terminal apparatus 1, a navigation system (one of the terminal function units) is started. It is assumed that, in the grandma's terminal apparatus 1, the scenario "start_up(navi( ))" contains information indicating that the navigation system is to be started.

Next, the transmitting unit 208 transmits the command "set_destination($ positional information);" to the terminal apparatus with "103".

Next, the grandma's terminal apparatus 1 receives the command "set_destination($ positional information);", and sets the positional information (Xe, Ye) as the destination position to the navigation system according to the command. It is assumed that, in the grandma's terminal apparatus 1, the scenario "set_destination($ positional information);" contains information indicating that "$ positional information" is to be set as the destination position of the navigation system.

Next, the transmitting unit 208 transmits the command "route_search($ current position, $ destination position);", to the terminal apparatus 1 with "103".

Next, the grandma's terminal apparatus 1 substitutes the current position of the grandma's terminal apparatus for the variable "$ current position" of the command "route_search($ current position, $ destination position);". The grandma's terminal apparatus 1 substitutes the positional information (Xe, Ye) for the variable "$ destination position". It is assumed that the grandma's terminal apparatus 1 has a function of acquiring positional information, such as a GPS receiver, and can acquire "$ current position" using this function.

The grandma's terminal apparatus 1 executes the command "route_search((Xf, Yf), (Xe, Ye));", thereby performing a route search for navigation. Thus, the grandma's terminal apparatus 1 performs route guide. The destination position in the route guide is a position at which the user who performs voice input "bring grandma here" is located. It is assumed that, in the grandma's terminal apparatus 1, the scenario "route_search((Xf, Yf), (Xe, Ye));" contains information indicating that route guide between two positions is to be performed using the navigation system.

According to this specific example, based on a user operation at one terminal apparatus 1, another terminal apparatus 1 can be operated. According to this specific example, based on a user operation at one terminal apparatus, only another terminal apparatus 1 managed in that group can be operated.

Specific Example 4

In Specific Example 4, an information system will be described in which an object can move between terminals. More specifically, a case will be described in which the user of the terminal apparatus 1 causes a character located at the terminal apparatus 1 to move to another terminal apparatus (terminal apparatus (terminal "T") disposed on the street, in this example). It is assumed that the user of the terminal apparatus 1 is the user identified with the user identifier "A".

It is assumed that the user "A" who left his/her terminal apparatus 1 at home goes into town and is in front of the terminal "T".

Furthermore, it is assumed that the character with the character identifier "1" is currently located at the terminal apparatus 1 of the user (the terminal identifier "101"), and this fact (user identifier: A, terminal identifier: 101, character identifier: 1) is held by the scenario generating unit 207 of the server apparatus 2.

It is assumed that, in this status, the user "A" inputs the user identifier "A" and the voice "come here" to the terminal "T".

Next, the terminal accepting unit 104 of the terminal "T" accepts the user identifier "A" and the voice "come here". Next, the terminal request constructing unit 105 judges to construct a terminal request, using the accepted data.

Next, the terminal request constructing unit 105 of the terminal "T" constructs a terminal request (501, A, "come here"), using the user identifier "A", the voice "come here", and the terminal identifier "501" of the terminal "T". It is assumed that the terminal request constructing unit 105 has a voice recognition function, and converts the voice "come here" into a character string "come here". It is assumed that the terminal "T" holds the terminal identifier "501" in advance.

Next, the terminal transmitting unit 106 of the terminal "T" transmits the constructed terminal request (501, A, "come here"), to the server apparatus 2.

Next, the receiving unit 205 of the server apparatus 2 receives the terminal request (501, A, "come here"), from the terminal apparatus 1.

Next, the terminal request processing unit 206 interprets the terminal request received by the receiving unit 205. The terminal request processing unit 206 judges that there is processing that is to be performed by the server apparatus 2, using an interpretation result of the terminal request. That is to say, the terminal request processing unit 206 judges that "come here" matches the record with "ID=4" in the table in FIG. 8. The terminal request processing unit 206 obtains scenario base information "ch=get_char($ user identifier, $ character); delete($ user identifier, $ character); put_char($ terminal identifier, ch)", in the record with "ID=4". The obtained scenario base information contains variables, and, thus, the terminal request processing unit 206 judges that there is processing that is to be performed by the server apparatus 2.

Next, the terminal request processing unit 206 acquires "A" corresponding to "$ user identifier", from the terminal request. The terminal request processing unit 206 acquires information on the character with "ID=1" corresponding to "$ character". From (user identifier: A, terminal identifier: 101, character identifier: 1), the terminal request processing unit 206 can acquire the character identifier "1" corresponding to the user identifier "A". The terminal request processing unit 206 acquires "501" corresponding to "$ terminal identifier", from the terminal request.

Next, the scenario generating unit 207 substitutes values for the variables of "ch=get_char($ user identifier, $ character);", thereby obtaining "ch=get_char(A, 1);". The scenario generating unit 207 executes "ch=get_char(A, 1);", and substitutes character information for the variable "ch". Next, the scenario generating unit 207 substitutes values for the variables of "delete($ user identifier, $ character);", thereby obtaining "delete(A, 1);". The scenario generating unit 207 executes "delete(A, 1);", and acquires character information corresponding to the user identifier "A" and the terminal identifier "101" of the terminal apparatus 1 at which the character is currently located. The character information includes a character image.

The transmitting unit 208 transmits "delete(A, 1);", to the terminal apparatus 1 identified with the terminal identifier "101". The terminal receiving unit 107 of the terminal apparatus 1 identified with the terminal identifier "101" receives the scenario "delete(A, 1);", and the terminal parser unit 108 interprets the scenario. The terminal function calling unit 109 deletes the character with "ID=1", from the display screen.

Next, the scenario generating unit 207 substitutes a value for the variable of "put_char($ terminal identifier, ch)", thereby obtaining "put_char(501, ch)". It is assumed that the character information has been substituted for the variable "ch".

Next, the transmitting unit 208 transmits "put_char(501, ch)", to the terminal "T" identified with the terminal identifier "501".

Next, the terminal receiving unit 107 of the terminal "T" receives "put_char(501, ch)". The terminal parser unit 108 interprets "put_char(501, ch)". The terminal function calling unit 109 of the terminal "T" gives data of the variable "ch"

(data of the character) to the character driver, thereby starting the character driver. Thus, the character is displayed on the display screen of the terminal "T".

As described above, according to this specific example, an object can move between terminals.

As described above, according to this embodiment, it is possible to allow a terminal apparatus including one or more pieces of hardware driven by drivers and not having sufficient information processing ability, to perform complicated information processing while effectively utilizing the one or more pieces of hardware.

In this embodiment, processing is performed in which the server apparatus 2 interprets the terminal request transmitted from the terminal apparatus 1 and returns a scenario to the terminal apparatus 1. Note that the server apparatus 2 may transmit a scenario to the terminal apparatus 1 if a predetermined condition is met, even in the case where no terminal request is received from the terminal apparatus 1. The predetermined condition is, for example, that it is a predetermined time, that the state of the server apparatus 2 meets a predetermined condition, or the like. The state of the server apparatus 2 meeting a predetermined condition is, for example, a state in which the CPU load is a threshold or less, that the server apparatus 2 has been started, or the like.

In this embodiment, for example, when the server apparatus 2 has a failure, the terminal apparatus 1 stands by until the server apparatus 2 is recovered from the failure or until notice of recovery from the failure is received from the server apparatus 2, and the terminal apparatus 1's own function operates. In this case, typically, the terminal apparatus 1 holds (saves) the current state. The terminal apparatus 1's own function is, for example, a state in which the OS can accept an instruction or the like from the user. If notice of recovery from the failure is received from the server apparatus 2, the terminal apparatus 1 calls the saved state, and resumes the communication with the server apparatus 2.

Furthermore, when the terminal apparatus 1 performs processing, typically, the terminal apparatus 1 is in continuous communication with the server apparatus 2. Accordingly, if the server apparatus 2 has a failure, for example, the processing by the terminal apparatus 1 may be stopped.

The processing in this embodiment may be realized using software. The software may be distributed by software download or the like. Furthermore, the software may be distributed in a form where the software is stored in a storage medium such as a CD-ROM. Note that the same is applied to other embodiments described in this specification. The software that realizes the terminal apparatus 1 in this embodiment may be the following sort of program. Specifically, this program is a program using a storage medium in which one or more driver identifiers each for identifying a driver of each of one or more terminal function units are stored, for causing a computer to function as: a terminal accepting unit that accepts one or more instructions from a user; a terminal request constructing unit that constructs a terminal request, which is a request corresponding to the one or more instructions; a terminal transmitting unit that transmits the terminal request to a server apparatus; a terminal receiving unit that receives a scenario having a command and data from the server apparatus, in response to transmission of the terminal request; a terminal parser unit that interprets the scenario, thereby acquiring the one or more driver identifiers and data that is to be given to one or more terminal function units identified with the one or more driver identifiers, the data being contained in the scenario; and a terminal function calling unit that gives the data acquired by the terminal parser unit, to the one or more terminal function units identified with the one or more driver identifiers acquired by the terminal parser unit, thereby calling the one or more terminal function units.

Embodiment 2

In this embodiment, an information system will be described in which a server apparatus manages current information of terminal apparatuses, so that the server apparatus receives a terminal request constructed from an instruction or the like from users at two or more terminal apparatuses, performs processing using the terminal request, constructs a scenario using the processing result, scenario base information acquired using the terminal request, and the current information of the terminal apparatuses, and transmits the scenario to the two or more terminal apparatuses. The terminal apparatuses interpret the scenario, drive a driver, and cause hardware (a terminal function unit) to operate. In this embodiment, the scenario may be constructed without using the current information.

In this embodiment, an information system will be described in which a server apparatus manages drivers of two or more terminal apparatuses. In this embodiment, for example, a server apparatus manages users and types of terminal apparatuses and manages drivers included in each type of terminal apparatus, thereby managing the drivers of the terminal apparatuses. Note that the type of terminal apparatus refers to, for example, a model name, a product name, or the like.

In this embodiment, an information system will be described in which, based on an operation on one terminal apparatus, a server apparatus transmits a command to another terminal apparatus, and the other terminal apparatus executes the command.

In this embodiment, an information system will be described in which two or more terminal apparatuses are managed in a group, and the other terminal apparatus to which a command can be transmitted is limited to those in the group.

In this embodiment, an information system will be described in which each user can change terminal apparatuses that are used by that user. In this embodiment, if the terminal apparatuses are changed, the user's current information can be transferred to the terminal apparatus after the change.

In this embodiment, an information system will be described in which terminal requests are accumulated, and a scenario is generated based on a history of two or more terminal requests. That is to say, an information system will be described in which different scenarios are generated according to a history of an instruction from the user.

Furthermore, in this embodiment, an information system will be described in which statistical processing is performed on accumulated terminal requests.

A conceptual diagram of an information system 20 in this embodiment is as shown in FIG. 1. The information system 20 in this embodiment includes one or at least two terminal apparatuses 1 and a server apparatus 22.

Figure 17:
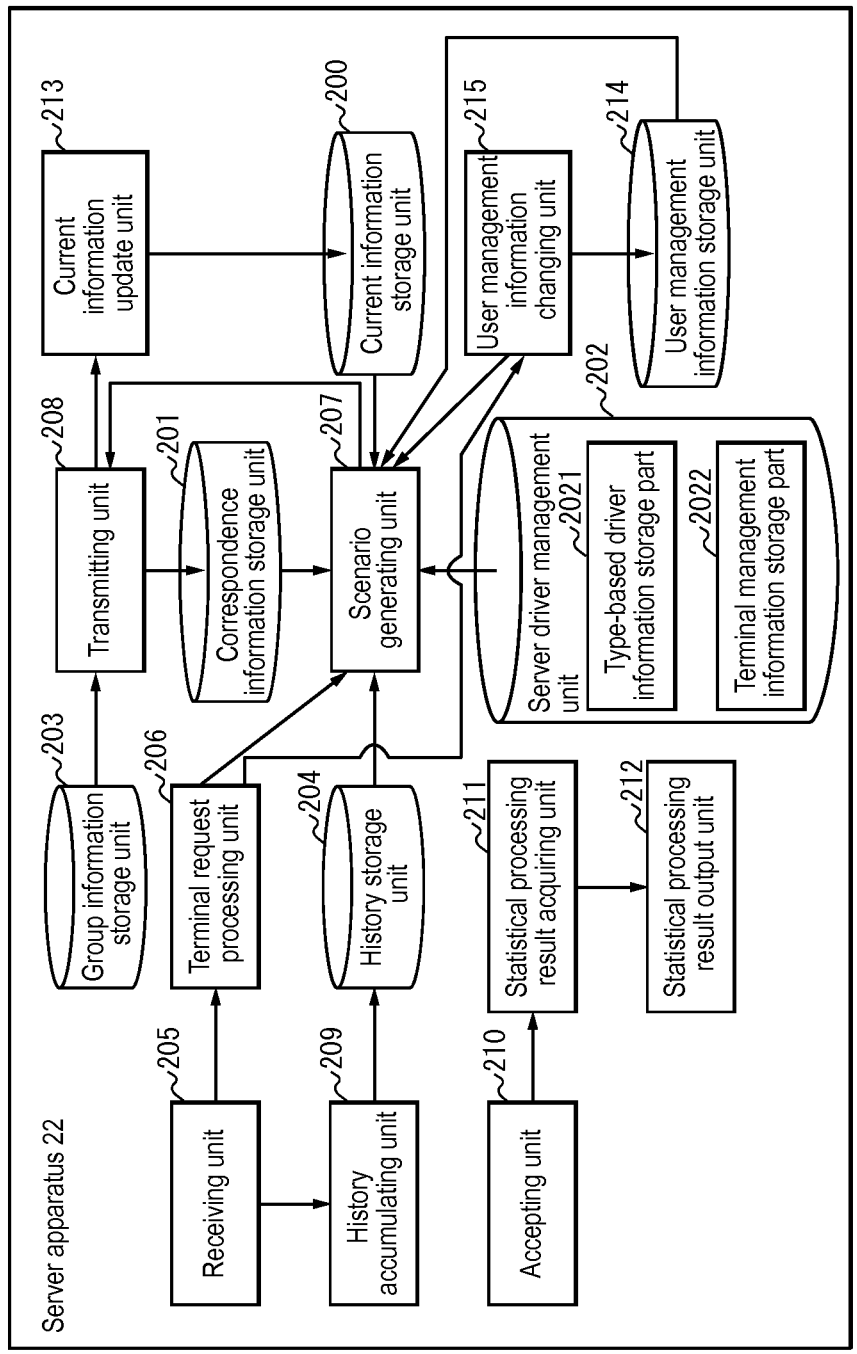
FIG. 17 is a block diagram of a server apparatus 22 forming an information system in Embodiment 2.

FIG. 17 is a block diagram of the server apparatus 22 forming the information system in this embodiment. The server apparatus 22 includes a current information storage unit 200, the correspondence information storage unit 201, the server driver management unit 202, the group information storage unit 203, the history storage unit 204, the receiving unit 205, the terminal request processing unit 206, the scenario generating unit 207, the transmitting unit 208, the history accumulating unit 209, the accepting unit 210, the statistical processing result acquiring unit 211, the statistical processing result output unit 212, a current information update unit 213, a user management information storage unit 214, and a user management information changing unit 215.

Furthermore, the server driver management unit 202 includes a type-based driver information storage part 2021 and a terminal management information storage part 2022.

In the current information storage unit 200 forming the server apparatus 22, one or at least two pieces of current information can be stored for each terminal apparatus 1. The current information is information indicating a current state of the terminal apparatus 1. The current information has, for example, an object identifier of an object that is being output at the terminal apparatus 1. The current information has, for example, positional information indicating the position of an object that is being output at the terminal apparatus 1, the size of the object, or the like.

In the server driver management unit 202, one or more driver identifiers of the terminal function units 101 included in the one or at least two terminal apparatuses 1 can be stored for each terminal apparatus 1.

In the type-based driver information storage part 2021 forming the server driver management unit 202, one or more pieces of type-based driver information each for associating a type identifier indicating the type of terminal apparatus 1 and one or more driver identifiers can be stored. Note that the information for associating A and B may be information having A and B, may be information indicating a linkage between A and B, or may be information having information indicating a location where A is stored and information indicating a location where B is stored, for example. The type of terminal apparatus 1 refers to, for example, a model, a manufacturer, a manufacturer and a model, or the like.

In the terminal management information storage part 2022, one or more pieces of terminal management information each for associating a terminal identifier for identifying the terminal apparatus 1 and a type identifier can be stored.

The scenario generating unit 207 in this example generates a scenario, using the scenario base information acquired by the terminal request processing unit 206, the processing result obtained by the processing performed by the terminal request processing unit 206, and the current information corresponding to the terminal apparatus 1.

Furthermore, the scenario generating unit 207 may generate a scenario, using the scenario base information acquired by the terminal request processing unit 206 and the processing result obtained by the processing performed by the terminal request processing unit 206.

Typically, the scenario generating unit 207 generates different scenarios according to the one or more driver identifiers stored in the server driver management unit 202. "To generate different scenarios" is, for example, to generate a scenario such that it does not contain a driver identifier of a driver not contained in the terminal apparatus 1. For example, if the terminal apparatus 1 to which a scenario to give an instruction to perform voice output is to be transmitted is a terminal apparatus 1 that does not include a driver for voice output (the terminal function unit 101) but includes a display device (with a driver for display (the terminal function unit 101)), the information that is to be output is changed to a scenario to perform display on the display device. The scenario to display information on the display device may be a scenario to output information in character strings, or may be a scenario to output information by means of sign languages or gestures of a character. That is to say, the scenario generating unit 207 changes, for example, the scenario so that the driver or the terminal function unit 101 included in the terminal apparatus 1 is started among the multiple drivers or the terminal function units 101 having information output functions.

Furthermore, in the case of constructing a scenario that is to be transmitted to the terminal apparatus 1 not having the driver or the terminal function unit 101 corresponding to an instruction (e.g., instruction to output information) contained in that scenario, the scenario generating unit 207 may generate a scenario such that the portion corresponding to the command is deleted. In this case, a loss occurs in the content of the scenario that was to be generated. Specifically, for example, in the case of a scenario containing a command or the like to reproduce an image and voice at a terminal, the scenario that is to be transmitted to the terminal apparatus 1 having a driver for a display device and a driver for a loudspeaker is a scenario containing a command or the like to reproduce an image and voice at a terminal, whereas the scenario that is to be transmitted to the terminal apparatus 1 not having a driver for a loudspeaker is a scenario containing a command or the like to reproduce an image at a terminal but not containing a command to reproduce voice.

It is preferable that the server apparatus 22 performs processing for the driver not contained in the terminal apparatus 1. This processing is typically performed by the terminal request processing unit 206.

If the user changes the terminal apparatuses 1 for use, the scenario generating unit 207 preferably generates a scenario, using current information of a previous terminal apparatus. The previous terminal apparatus is the terminal apparatus 1 before the change.

Furthermore, if the user changes the terminal apparatuses 1 for use, the transmitting unit 208 transmits the scenario generated by the scenario generating unit 207, to a new terminal apparatus.

The current information update unit 213 updates the current information in response to transmission of the scenario to the terminal apparatus 1. The current information that is to be updated is the current information of the terminal apparatus 1 to which the scenario was transmitted. The current information update unit 213 may update the current information, regardless of whether or not the scenario is transmitted to the terminal apparatus 1. For example, if the current information contains the positional information of the terminal apparatus 1 and the positional information of the terminal apparatus 1 is received from the terminal apparatus 1, the current information update unit 213 updates the positional information of the terminal apparatus 1 to the latest positional information. Note that the latest positional information is positional information received at a time closest to the current time.

In the user management information storage unit 214, one or more pieces of user management information can be stored. The user management information is information for associating a user identifier for identifying the user of the terminal apparatus 1 and a terminal identifier. The user management information is information for managing a terminal apparatus that is currently being used by the user.

If the terminal request is a request to change the terminal apparatuses 1 on which processing is to be performed, the user management information changing unit 215 changes the terminal identifier contained in the user management information and corresponding to the user identifier of the user of the terminal apparatus 1 from which the terminal request was transmitted, to the terminal identifier of a new terminal apparatus so that the terminal apparatus 1 on which processing is to be performed is changed from the previous terminal apparatus, which is the terminal apparatus 1 on which processing is currently being performed, to the new terminal apparatus.

The current information storage unit 200 and the user management information storage unit 214 are preferably a non-volatile storage medium, but may be realized also by a volatile storage medium. There is no limitation on the procedure in which the current information and the like are stored in the current information storage unit 200 and the like.

The current information update unit 213 and the user management information changing unit 215 may be realized typically by an MPU, a memory, or the like. Typically, the processing procedure of the current information update unit 213 and the like is realized by software, and the software is stored in a storage medium such as a ROM. Note that the processing procedure may be realized also by hardware (a dedicated circuit).

Next, an operation of the server apparatus 22 forming the information system 20 will be described with reference to the flowchart in FIG. 18. In the flowchart in FIG. 18, a description of the same steps as those in FIG. 5 has been omitted.

(Step S1801) The scenario generating unit 207 constructs a scenario. Note that the processing that constructs a scenario will be described later with reference to the flowchart in FIG. 19.

(Step S1802) The user management information changing unit 215 judges whether or not the instruction from the user is to change the terminal apparatuses 1, from the terminal request or the transmitted scenario. If it is to change the terminal apparatuses 1, the procedure advances to step S1803, and, if not, the procedure returns to step S501.

(Step S1803) The user management information changing unit 215 changes the terminal identifier contained in the user management information and corresponding to the user identifier of the user of the terminal apparatus 1 from which the terminal request was transmitted, to the terminal identifier of a new terminal apparatus so that the terminal apparatus 1 is changed from the previous terminal apparatus, which is the terminal apparatus 1 from which the terminal request was transmitted and on which processing is currently being performed, to the new terminal apparatus.

(Step S1804) The current information update unit 213 updates the current information in response to transmission of the scenario to the terminal apparatus 1. If there is no need to update the current information, no processing is performed in step S1804. The procedure returns to step S501.

Figure 18:
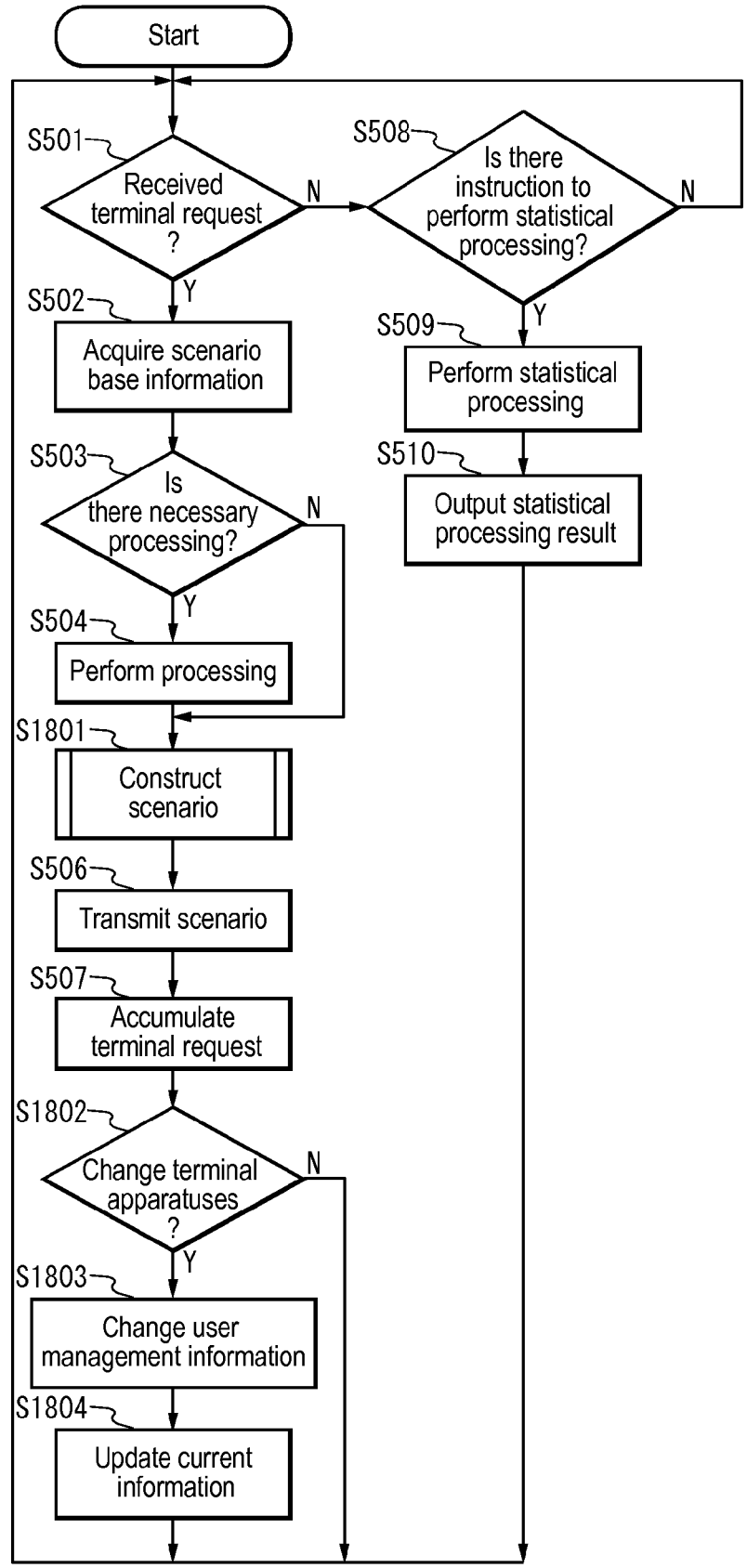
FIG. 18 is a flowchart illustrating an operation of the server apparatus 22 in the embodiment.

It will be appreciated that, in the flowchart in FIG. 18, there is no limitation on the order of processing that can be performed independently of the other processing, such as the processing in step S507.

Note that the procedure is terminated by powering off or an interruption at completion of the process in the flowchart in FIG. 18.

Figure 19:
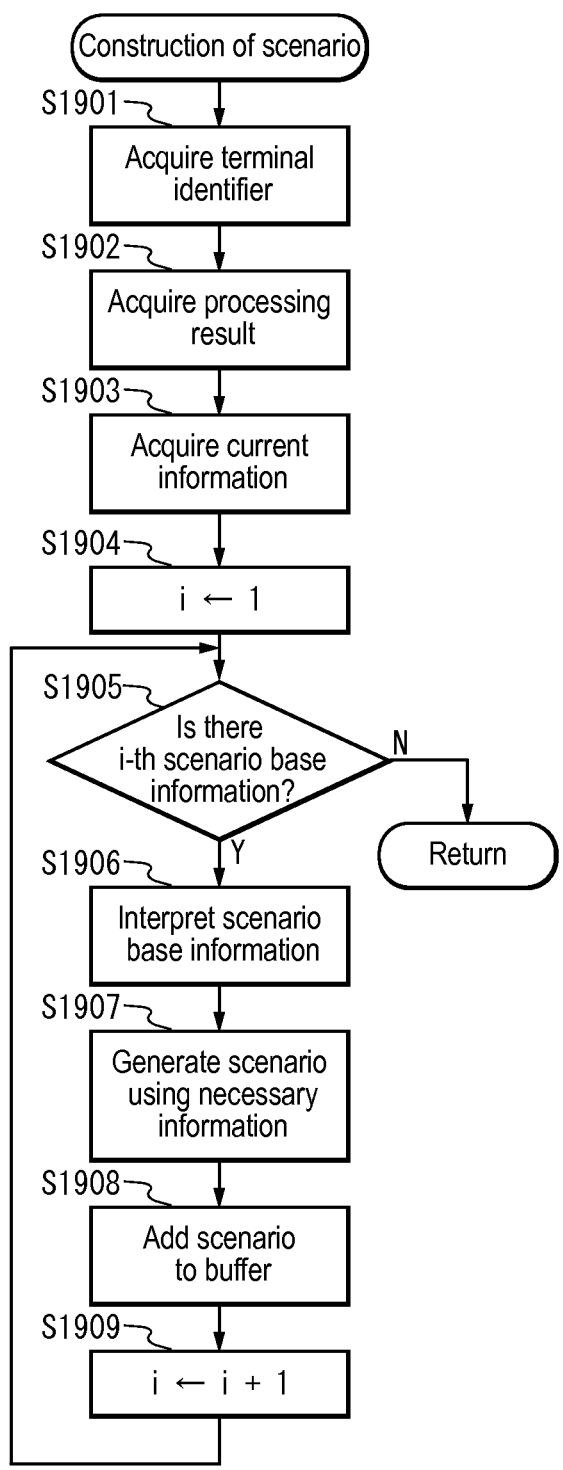
FIG. 19 is a flowchart illustrating processing that constructs a scenario in the embodiment.

Next, the processing that constructs a scenario in step S1801 will be described with reference to the flowchart in FIG. 19.

(Step S1901) The scenario generating unit 207 acquires the terminal identifier contained in the terminal request, and arranges it on a memory.

(Step S1902) The scenario generating unit 207 acquires the processing result in step S504, and arranges it on the memory. Note that the processing result in step S504 may not exist.

(Step S1903) The scenario generating unit 207 acquires the current information corresponding to the terminal identifier acquired in step S1901, from the current information storage unit 200, and arranges it on the memory.

(Step S1904) The scenario generating unit 207 substitutes 1 for a counter i.

(Step S1905) The scenario generating unit 207 judges whether or not there is an i-th processing unit of scenario base information, in the scenario base information acquired in step S502. If there is an i-th processing unit, the procedure advances to step S1906, and, if not, the procedure returns to the upper-level processing. The processing unit is, for example, a unit in which the scenario generating unit 207 performs parsing, and examples thereof include a line.

(Step S1906) The scenario generating unit 207 interprets the i-th processing unit of scenario base information.

(Step S1907) The scenario generating unit 207 acquires necessary information from the memory, using the interpretation result in step S1906. The scenario generating unit 207 generates a scenario, using the i-th processing unit of scenario base information and the acquired information. For example, the scenario generating unit 207 substitutes the acquired information for variables of the i-th processing unit of scenario base information, thereby acquiring a scenario.

(Step S1908) The scenario generating unit 207 adds the scenario acquired in step S1907, to the buffer.

(Step S1909) The scenario generating unit 207 increments the counter i by 1. The procedure returns to step S1905.

Above, an example of processing for constructing a scenario was described with reference to the flowchart in FIG. 19. That is to say, the processing for constructing a scenario may be other processing.

Hereinafter, a specific operation of the information system in this embodiment will be described. A conceptual diagram of the information system is shown in FIG. 1.

FIG. 6 shows an exemplary terminal driver management table stored in the terminal driver management unit 102 of the terminal apparatus 1.

FIG. 7 shows an exemplary terminal object management table stored in the terminal object storage unit 103 of the terminal apparatus 1.

FIG. 20 shows a correspondence information management table stored in the correspondence information storage unit 201 of the server apparatus 22. The structure of the correspondence information management table is the same as that shown in FIG. 8. In FIG. 20, "call($ character)" is a scenario to call a character specified with "$ character" to the terminal apparatus 1 and output it on the terminal apparatus 1, "volume_up($ terminal apparatus identifier, $ numerical value)" is a scenario to increase, by "$ numerical value", the volume output by the terminal apparatus 1 identified with "$ terminal apparatus identifier", and "tel (terminal, "turn power on")" is a scenario to make a phone call to the terminal apparatus 1 specified with terminal, and output "turn power on". It will be appreciated that these scenarios and functions are merely examples.

FIG. 21 shows an exemplary type-based driver information management table stored in the type-based driver information storage part 2021 of the server driver management unit 202 of the server apparatus 22. In the type-based driver information management table, one or more records each having "ID", "type identifier", and "driver identifier" are stored. "ID" is information for identifying a record. "Type identifier" is information for identifying the type of terminal apparatus 1. "Driver identifier" is information for identifying a driver. That is to say, the type-based driver information management table manages, for each type of one or more terminal apparatuses 1, drivers included in the terminal apparatuses 1.

FIG. 22 shows a terminal management information management table in the terminal management information storage part 2022. The terminal management information management table is a table for managing types of terminal apparatuses 1, and, in the table, one or more records each having "ID", "terminal identifier", and "type identifier" are stored.

FIG. 10 shows a group information management table stored in the group information storage unit 203 of the server apparatus 22.

FIG. 11 shows an exemplary history management table stored in the history storage unit 204 of the server apparatus 22.

FIG. 23 shows a current information management table stored in the current information storage unit 200. The current information management table is a table for managing current states of terminal apparatuses 1. In the current information management table, one or more records each having "ID", "terminal identifier", and "current information" are stored. "Current information" has "object identifier", "output position", "image ID", "power", and the like. "Object identifier" of "current information" is an identifier of an object that is being output at the terminal apparatus 1, "output position" is an output position of an object on a screen, and "image ID" is information for identifying an image that is being output at the terminal apparatus 1, and is information corresponding to a value of the record item "ID" in the character management table in FIG. 25. "Power" is information indicating whether the power is on or off. In this example, it is assumed that, even when "power=OFF", the telephone function of the terminal apparatus 1 can be used. That is to say, "power=OFF" refers to a standby state only for phone calls.

FIG. 24 shows a user management information management table stored in the user management information storage unit 214. The user management information management table is a table for managing terminal apparatuses that are currently being used by the users, and, in the table, one or more records each having "ID", "user identifier", and "terminal identifier" are stored.

FIG. 25 shows a character management table held by the scenario generating unit 207. The character management table has "ID", "character ID", "name", and "data". "Data" has "image", "voice", and "part information". "Part information" has "part identifier" and "partial region information". "Data" preferably contains "entire region information". "Entire region information" is information similar to "entire region information" in FIG. 7. "ID" is information for identifying a record. "Character ID" is a character identifier. "Name" is a name of a character. "Data" is data output by the terminal apparatus 1. "Image" is typically a moving image, but may be a still image.

FIG. 12 shows a related user management table held by the terminal request processing unit 206.

Hereinafter, a specific operation of the information system in this embodiment, which will be performed in this status, will be described by way of four examples.

Specific Example 1

In Specific Example 1, an exemplary information system will be described in which the server apparatus 22 interprets a command input to the terminal apparatus 1, transmits an object (a character, in this example) to the terminal apparatus 1, and manages the state of the terminal apparatus 1. More specifically, processing will be described, in which in order to call a character "Y-chan" to the terminal apparatus 1, the user of the terminal apparatus 1 performs voice input "Y-chan, come here", thereby causing the character "Y-chan" to be displayed on the terminal apparatus 1 according to the scenario from the server apparatus 22.

It is assumed that, first, the user of the terminal apparatus 1 identified with the terminal apparatus identifier "101" gives an instruction "Y-chan, come here" by voice, to his/her own terminal apparatus 1. Next, the terminal accepting unit 104 accepts the voice "Y-chan, come here". According to the current information management table in FIG. 23, the current information of the terminal apparatus 1 identified with the terminal identifier "101" is currently "object identifier: NULL(-), output position: NULL(-), image ID: NULL(-), . . . , power "1 (ON)"", that is, the terminal apparatus 1 is on, but no object is displayed.

Next, since a break occurs in the voice, the terminal request constructing unit 105 judges to construct a terminal request. The terminal request constructing unit 105 digitalizes the voice "Y-chan, come here", thereby obtaining voice data. The terminal request constructing unit 105 acquires the terminal identifier "101" stored in advance and positional information (Xa, Ya) acquired by an unshown GPS receiver. The terminal request constructing unit 105 acquires a current time "2012/10/27 10:38:51" from an unshown clock or an external apparatus (e.g., NTP server). The terminal request constructing unit 105 constructs a terminal request "101, (Xa, Ya), 2012/10/27 10:38:51, voice data "Y-chan, come here"". The terminal identifier "101" is static terminal unique information, and the positional information and the current time are dynamic terminal unique information. The voice data "Y-chan, come here" corresponds to instruction content information. Note that this terminal request does not have an object identifier of an object on which the instruction is given. This terminal request has "terminal identifier, positional information, current time, instruction content information", but it will be appreciated that the structure of this terminal request is merely an example.

Next, the terminal transmitting unit 106 transmits the constructed terminal request, to the server apparatus 22.

Next, the receiving unit 205 of the server apparatus 22 receives the terminal request "101, (Xa, Ya), 2012/10/27 10:38:51, voice data "Y-chan, come here"", from the terminal apparatus 1.

Next, the terminal request processing unit 206 acquires the instruction content information "voice data "Y-chan, come here"", from the received terminal request. The terminal request processing unit 206 performs voice recognition on the voice data "Y-chan, come here", thereby acquiring a character string "Y-chan, come here".

Next, the terminal request processing unit 206 performs a search in the correspondence information management table in FIG. 20, using the character string "Y-chan, come here" corresponding to the instruction content information. Note that the character string corresponding to the instruction content information may be the instruction content information.

The terminal request processing unit 206 judges that the instruction content information matches the terminal request "$ character "come here"" with "ID=1" in the correspondence information management table. The terminal request processing unit 206 acquires the scenario base information "call($ character)" with "ID=1" in the correspondence information management table.

Next, the scenario generating unit 207 obtains the value "Y-chan" of the variable "$ character", from the terminal request "$ character "come here"" and the character string "Y-chan, come here". Next, the scenario generating unit 207 performs a search in the character management table in FIG. 25, using "Y-chan", thereby obtaining data (image and voice) of the record with "ID=1". The scenario generating unit 207 constructs a scenario "call(image, voice)", from the scenario base information "call($ character)" and the data (image and voice) of the record with "ID=1". This scenario contains the data (image and voice) of the record with "ID=1". That is to say, "call(image, voice)" means that an image and voice are contained.

Next, the transmitting unit 208 transmits the constructed scenario "call(image, voice)", to the terminal apparatus 1. Note that the transmitting unit 208 holds information on a transmission destination (e.g., IP address) corresponding to the terminal identifier "101", and transmits the scenario to the terminal apparatus 1 using the information on the transmission destination.

Next, the history accumulating unit 209 accumulates a request history "101, (Xa, Ya), 2012/10/27 10:38:51, "Y-chan, come here"", in the history storage unit 204, using the received terminal request. The history accumulating unit 209 may accumulate the scenario base information "call($ character)" or the scenario "call(image, voice)", in the history storage unit 204. In this case, the part of the terminal request may be the scenario base information or the generated scenario.

Next, the current information update unit 213 updates the current information of the terminal apparatus 1 identified with the terminal identifier "101". That is to say, the current information update unit 213 acquires the character identifier "1" and the image ID "1" of "Y-chan". The current information update unit 213 writes "1" to the attribute value of "object identifier" and "1" to the attribute value of the image ID, in the record corresponding to the terminal identifier "101" in the current information management table in FIG. 23. That is to say, the current information update unit 213 changes the object identifier that is currently "NULL(-)", to "1", and changes the image ID that is currently "NULL(-)", to "1", in the record with "ID=1". The current information update unit 213 may also write a character's output position (e.g., initial values (0, 0) of the output position, etc.) on the terminal apparatus 1.

Next, the terminal receiving unit 107 of the terminal apparatus 1 receives the scenario "call(image, voice)", from the server apparatus 22.

Next, the terminal parser unit 108 interprets the received scenario, thereby causing the character (image and voice) to be displayed on the display screen. That is to say, the terminal function calling unit 109 executes a driver calling function "show_char(image)" corresponding to the driver identifier "character", using the scenario "call(image, voice)", thereby causing the character to be displayed on the display screen. Furthermore, the terminal function calling unit 109 executes a driver calling function "voice (voice)" corresponding to the driver identifier "voice reproduction", using the scenario "call(image, voice)", thereby reproducing the voice of the character.

Next, the record with "ID=1" in FIG. 7 is stored in the terminal object management table of the terminal apparatus 1 identified with "101". Note that the display flag "1" in FIG. 7 is obtained by changing the original display flag "0" to "1".

As described above, according to this specific example, the processing by the terminal apparatus 1 is continued in a state where the terminal apparatus 1 and the server apparatus 22 are communicating with each other, and the terminal request transmitted from the terminal apparatus 1 is interpreted by the server apparatus 22. The server apparatus 22 performs at least part of the processing, constructs a scenario, using the processing result and the scenario base information corresponding to the terminal request, and transmits the scenario to the terminal apparatus 1. The terminal apparatus 1 interprets the scenario including driving of a driver included in that terminal apparatus, causes the driver to operate, and performs desired processing. In the server apparatus 22, the current state of the terminal apparatus 1 is managed in the current information management table.

Specific Example 2

In Specific Example 2, an example will be described in which the server apparatus 22 interprets the terminal request transmitted from the terminal apparatus 1, and causes a driver of the terminal apparatus 1 to operate. In Specific Example 2, an exemplary operation will be described in which different operations can be realized in the terminal apparatus 1 based on a history of user operations at the terminal apparatus 1. More specifically, processing will be described in which, if the user of the terminal apparatus 1 touches the breasts of a character that is being displayed on the terminal apparatus 1 at a level corresponding to a threshold or more, the affinity level with respect to the user of the terminal apparatus 1 is lowered, and an operation of the character becomes different from that in the case where the affinity level is high. In Specific Example 2, an operation will be described in which different scenarios are transmitted to the terminal apparatus 1 according to information on drivers of the terminal apparatus 1 managed by the server apparatus 22.

In the history management table in FIG. 11, the affinity level of the character "ID=1" with respect to the user with the terminal identifier "101" is "high". It is assumed that the affinity level is managed among three levels consisting of "high", "middle", and "low". From the history management table in FIG. 11, it is seen that the user with the terminal identifier "101" has touched the character identified with the character identifier "1" on the breasts once and on the face once.

In this example, it is assumed that the terminal request processing unit 206 lowers the affinity level by one if the breasts or the belly of the character is touched three times or more within three minutes.

It is assumed that, in this status, the user of the terminal apparatus 1 touches the breasts of the character with "character ID=1" on the screen in FIG. 13. The screen in FIG. 13 is a touch panel.

Next, the terminal accepting unit 104 accepts an instruction (e.g., point(xb, yb)) containing the coordinate information indicating the touch on the breasts of the character "1" from the user. The point(xb, yb) is, for example, output from the driver of the touch panel.

Next, the terminal request constructing unit 105 acquires the character identifier (object identifier) "1" corresponding to "display flag=1" in the terminal object management table in FIG. 7.

The terminal request constructing unit 105 judges that a touch has been performed, from the instruction (point(xb, yb)). The terminal request constructing unit 105 detects that the coordinate information (xb, yb) refers to a point inside the region specified with the partial region information "(x101, y101) (x102, y102) . . . " in the record with "ID=1"

in the terminal object management table in FIG. 7. The terminal request constructing unit 105 acquires a part identifier "1" paired with this partial region information.

Next, the terminal request constructing unit 105 judges to construct a terminal request, because the part identifier "1" can be acquired from the accepted instruction. Note that the terminal request constructing unit 105 judges to construct a terminal request, if the part identifier managed in the terminal object management table in FIG. 7 can be acquired.

Next, the terminal request constructing unit 105 constructs a terminal request "touch (1, 1)". That is to say, the terminal request constructing unit 105 acquires "touch" from the judgment that a touch has been performed, and obtains arguments (1, 1) of "touch" from the object identifier "1" and the part identifier "1". It is assumed that the terminal request constructing unit 105 holds a function name (example of information forming the terminal request) according to the type of operation (touch (click), double click, drag, etc.) performed by the user on the object.

Furthermore, it is assumed that the terminal request constructing unit 105 has acquired, for example, the terminal identifier "101", the positional information (Xc, Yc), and the current time "2012/10/28 11:38:25". It is assumed that the terminal request constructing unit 105 has constructed a terminal request "touch (1, 1), 101, (Xc, Yc), 2012/10/28 11:38:25" that is to be transmitted, from the terminal request "touch (1, 1)" together with the terminal identifier, the positional information, and the current time.

Next, the terminal transmitting unit 106 transmits the constructed terminal request, to the server apparatus 22.

Next, the receiving unit 205 of the server apparatus 22 receives the terminal request "touch (1, 1), 101, (Xc, Yc), 2012/10/28 11:38:25", from the terminal apparatus 1.

Next, the terminal request processing unit 206 interprets the terminal request received by the receiving unit 205, thereby acquiring "touch (1, 1)". The terminal request processing unit 206 judges that "touch (1, 1)" matches the record with "ID=3" in the correspondence information management table in FIG. 20. The terminal request processing unit 206 obtains "object identifier=1" and "part identifier=1" from "touch (1, 1)". In this case, "touch (1, 1)" has been performed only twice, and, thus, the terminal request processing unit 206 does not change the affinity level "high" in the history management table in FIG. 11.

Next, the scenario generating unit 207 acquires the scenario base information in the record with "ID=3", from the correspondence information management table. The scenario generating unit 207 obtains the affinity level "high" of the terminal identifier "101", from the history management table in FIG. 11, according to the acquired scenario base information. The scenario generating unit 207 interprets the scenario base information, thereby obtaining a description "show_char($ object identifier, ID=2)" corresponding to the affinity level "high" contained in the scenario base information. Next, the scenario generating unit 207 substitutes "1" for the variable "$ object identifier" of "show_char($ object identifier, ID=2)", thereby obtaining "show_char(1, 2)". Next, the scenario generating unit 207 acquires data corresponding to the object identifier "1" and with "ID=2" (data in the record with ID=2), from FIG. 25. This data is the image and the voice data "Oh no" in the record with "ID=2" in FIG. 25.

Furthermore, the scenario generating unit 207 acquires a type identifier "k01" corresponding to the terminal identifier "101". The scenario generating unit 207 judges whether or not there is "character" that is a driver identifier corresponding to the type identifier "k01" and corresponding to an image, from the driver information management table in FIG. 21. In this example, there is a driver identifier "character" corresponding to the type identifier "k01", and, thus, the scenario generating unit 207 acquires a scenario "(character, image in record with "ID=2")". The scenario generating unit 207 judges whether or not there is "voice reproduction" that is a driver identifier corresponding to the type identifier "k01" and corresponding to voice, from the driver information management table in FIG. 21. In this example, there is a driver identifier "voice reproduction" corresponding to the type identifier "k01", and, thus, the scenario generating unit 207 acquires a scenario "(voice reproduction, voice in record with "ID=2")". The scenario generating unit 207 constructs a scenario "(character, image in record with "ID=2"), (voice reproduction, voice in record with "ID=2")". It is assumed that show_char is a command to output the character on the terminal apparatus, and the scenario generating unit 207 holds information indicating that the driver identifier corresponding to an image is "character" and the driver identifier corresponding to voice is "voice reproduction".

Furthermore, for example, if the type identifier corresponding to the terminal identifier "101" is "k02", the scenario generating unit 207 judges that there is a driver identifier "character" corresponding to the type identifier "k02" and corresponding to an image but there is no driver identifier "voice reproduction" corresponding to voice, from the driver information management table in FIG. 21. The scenario generating unit 207 constructs a scenario "(character, image in record with "ID=2")".

Next, the transmitting unit 208 transmits the constructed scenario, to the terminal apparatus 1. Next, the history accumulating unit 209 accumulates the whole or part of the received terminal request, in the history storage unit 204. In this example, the history accumulating unit 209 accumulates "(1, 1, touch)", which is considered to be part of the terminal request, in the history storage unit 204.

Next, the current information update unit 213 updates the current information in response to transmission of the scenario to the terminal apparatus 1. That is to say, the current information update unit 213 changes the value of the image ID corresponding to the terminal apparatus identifier "101" to "2", in the current information management table in FIG. 23.

Next, the terminal receiving unit 107 of the terminal apparatus 1 receives the scenario "(character, image in record with "ID=2"), (voice reproduction, voice in record with "ID=2")", from the server apparatus 22.

Next, the terminal parser unit 108 interprets the received scenario, thereby acquiring the driver identifier "character", the image in the record with "ID=2", the driver identifier "voice reproduction", and the voice "Oh no". The terminal parser unit 108 holds a driver calling function corresponding to each driver identifier.

Next, the terminal function calling unit 109 gives the image in the record with "ID=2" to the driver corresponding to the driver identifier "character", using the driver calling function, and starts the driver. In a similar manner, the terminal function calling unit 109 gives the voice "Oh no" to the driver corresponding to the driver identifier "voice reproduction", and starts the driver. As a result, the character display in FIG. 13 changes as shown in FIG. 15, and the voice "Oh no" is output. Note that the character in FIG. 15 was touched on the breasts, but she is smiling because the affinity level is "high".

Next, it is assumed that, in a similar manner, the user of the terminal apparatus 1 touches the breasts of the character with "character ID=1" on the screen in FIG. 15.

Then, it is assumed that, in a similar manner, the terminal request constructing unit 105 constructs a terminal request "touch (1, 1), 101, (Xd, Yd), 2012/10/28 11:38:48" that is to be transmitted.

Next, the terminal transmitting unit 106 transmits the constructed terminal request, to the server apparatus 22.

Next, the receiving unit 205 of the server apparatus 22 receives the terminal request from the terminal apparatus 1. The terminal request processing unit 206 interprets the terminal request received by the receiving unit 205 in a similar manner. In this case, "touch (1, 1)" has been performed three times, and, thus, the terminal request processing unit 206 changes the affinity level in the history management table in FIG. 11 from "high" to "middle".

Next, the scenario generating unit 207 acquires the scenario base information in the record with "ID=3", from the correspondence information management table. The scenario generating unit 207 obtains the affinity level "middle" of the terminal identifier "101", from the history management table, according to the acquired scenario base information. The scenario generating unit 207 interprets the scenario base information, thereby obtaining a description "show_char($ object identifier, ID=3)" corresponding to the affinity level "middle" contained in the scenario base information. Next, the scenario generating unit 207 substitutes "1" for the variable "$ object identifier" of "show_char($ object identifier, ID=3)", thereby obtaining "show_char(1, 3)". Next, the scenario generating unit 207 acquires data corresponding to the object identifier "1" and with "ID=3" (data in the record with ID=3), from FIG. 11. This data is the image and the voice data "You're naughty" in the record with "ID=3" in FIG. 25. The scenario generating unit 207 acquires the driver identifier "character" corresponding to an image and the driver identifier "voice reproduction" corresponding to voice. The scenario generating unit 207 constructs a scenario "(character, image in record with "ID=3"), (voice reproduction, voice in record with "ID=3")".

Next, the transmitting unit 208 transmits the constructed scenario, to the terminal apparatus 1. Next, the history accumulating unit 209 accumulates the whole or part of the received terminal request, in the history storage unit 204. In this example, the history accumulating unit 209 accumulates "(1, 1, touch)", which is considered to be part of the terminal request, in the history storage unit 204.

Next, the current information update unit 213 changes the value of the image ID corresponding to the terminal apparatus identifier "101" to "3", in the current information management table in FIG. 23.

Next, the terminal receiving unit 107 of the terminal apparatus 1 receives the scenario "(character, image in record with "ID=3"), (voice reproduction, voice in record with "ID=3")", from the server apparatus 22.

Next, the terminal parser unit 108 interprets the received scenario, thereby acquiring the driver identifier "character", the image in the record with "ID=3", the driver identifier "voice reproduction", and the voice "You're naughty".

Next, the terminal function calling unit 109 gives the image in the record with "ID=3" to the driver corresponding to the driver identifier "character", and starts the driver. The terminal function calling unit 109 further gives the voice "You're naughty" to the driver corresponding to the driver identifier "voice reproduction", and starts the driver. As a result, the character display in FIG. 15 changes as shown in FIG. 16, and the voice "You're naughty" is output. Note that the character in FIG. 16 was touched on the breasts, but she is just hiding the breasts because the affinity level is "middle".

As described above, according to this specific example, in an information system in which the processing by the terminal apparatus 1 is continued in a state where the terminal apparatus 1 and the server apparatus 22 are communicating with each other, different operations can be realized in the terminal apparatus 1 based on a history of user operations at the terminal apparatus 1.

Specific Example 3

In Specific Example 3, an example will be described in which the server apparatus 22 interprets the terminal request transmitted from the terminal apparatus 1, and causes a driver of a terminal apparatus different from the terminal apparatus 1 from which the terminal request was transmitted, to operate according to a scenario transmitted from the server apparatus 22. More specifically, in Specific Example 3, an exemplary operation will be described in which, based on a user operation at one terminal apparatus 1, another terminal apparatus 1 can be operated. Furthermore, an example will be described in which different scenarios are applied according to the state of the terminal apparatus 1, so that different operations are performed.

First, it is assumed that the user of the terminal apparatus 1 identified with the terminal apparatus identifier "101" gives an instruction by voice to "bring grandma here", to his/her own terminal apparatus 1.

Next, the terminal accepting unit 104 of the terminal apparatus 1 accepts the voice "bring grandma here". Next, the terminal request constructing unit 105 detects a break in the voice accepted by the terminal accepting unit 104, and judges to construct a terminal request, using the instruction or the like accepted by the terminal accepting unit 104.

Next, the terminal request constructing unit 105 performs voice recognition on the voice "bring grandma here", thereby acquiring a character string "bring grandma here". The terminal request constructing unit 105 acquires a terminal identifier "101" stored in the terminal apparatus 1. The terminal request constructing unit 105 acquires positional information (Xe, Ye) acquired by the GPS receiver included in the terminal apparatus 1. The GPS receiver is, for example, one of the terminal function units 101. The terminal request constructing unit 105 acquires a current time "2012/10/28 13:59:53" from an unshown clock or an external apparatus (e.g., NTP server). The terminal request constructing unit 105 constructs a terminal request "101, (Xe, Ye), 2012/10/28 13:59:53, "bring grandma here"".

Next, the terminal transmitting unit 106 transmits the constructed terminal request, to the server apparatus 22.

Next, the receiving unit 205 of the server apparatus 22 receives the terminal request "101, (Xe, Ye), 2012/10/28 13:59:53, "bring grandma here"", from the terminal apparatus 1.

Next, the terminal request processing unit 206 acquires the instruction content information "bring grandma here", from the terminal request received by the receiving unit 205.

Next, the scenario generating unit 207 performs a search in the correspondence information management table in FIG. 20, using the instruction content information "bring grandma here". The scenario generating unit 207 judges that instruction content information matches the terminal request "$ person.* "bring here"" with "ID=5" in the correspondence information management table. The scenario generating unit 207 acquires the scenario base information with "ID=5" in the correspondence information management table.

Next, the scenario generating unit 207 detects that there is a variable in the terminal request "$ person.* "bring here"", and judges that there is processing that is to be performed by the server apparatus 22. The first processing that is to be performed by the server apparatus 22 is processing that acquires a variable "$ person".

Next, the scenario generating unit 207 acquires "grandma" corresponding to the variable "$ person", using the instruction content information "bring grandma here" and the terminal request "$ person.* "bring here"", from the instruction content information. There is no limitation on the method for acquiring "grandma". For example, the scenario generating unit 207 performs morphological analysis on "bring grandma here", thereby acquiring a word "grandma", and judges that this word corresponds to the variable "$ person".

Next, the scenario generating unit 207 interprets the scenario base information with "ID=5" in the correspondence information management table. That is to say, the scenario generating unit 207 substitutes "101" and "grandma" for the variables "$ terminal identifier" and "$ person" of "terminal=search($ terminal identifier, $ person)" of the scenario base information. The scenario generating unit 207 executes "terminal=search(101, grandma)". That is to say, the scenario generating unit 207 acquires a terminal identifier 2 "103", from the record matching "terminal identifier 1=101" and "relationship=grandma" in the related user management table in FIG. 12. That is to say, "terminal" of "terminal=search(101, grandma)" is acquired as "103".

Next, the scenario generating unit 207 interprets the scenario base information, thereby judging that there is a match with "terminal !=NULL". The scenario generating unit 207 acquires scenario base information corresponding to "terminal !=NULL", from the record with "ID=5" in FIG. 20. Next, the scenario generating unit 207 interprets "if (terminal. power==OFF)", thereby acquiring an attribute value "power=0", in the current information of the terminal apparatus 1 with the terminal identifier "103". In this example, "power=0" corresponds to "OFF", and "power=1" corresponds to "ON". In this example, power OFF refers to a state in which the telephone function operates, whereas the other functions have been stopped.

The scenario generating unit 207 judges that "if(terminal. power==OFF)" is true, and acquires scenario base information "tel(terminal, "turn power on")". The scenario generating unit 207 substitutes "103" for the variable "terminal", thereby obtaining a scenario "tel(103, "turn power on")".

Next, the transmitting unit 208 transmits the scenario "tel(103, "turn power on")", to the terminal apparatus 1 identified with the terminal identifier "103" (the grandma's terminal apparatus 1). That is to say, the transmitting unit 208 makes a phone call to the grandma's terminal apparatus 1, and transmits "turn power on". It is assumed that the transmitting unit 208 holds a telephone number corresponding to the terminal apparatus identifier "103".

Next, the telephone driver of the grandma's terminal apparatus 1 is started, and, when the grandma answers the phone call, "turn power on" is output by voice. It is then assumed that the grandma turns on the terminal apparatus 1 (makes the functions other than the telephone ready to operate).

Next, the scenario generating unit 207 acquires scenario base information "put($ positional information, terminal); start_up(navi( )); set_destination($ positional information); route_search($ current position, $ destination position);".

Next, the scenario generating unit 207 substitutes "positional information=(Xe, Ye)" and "terminal=103" for "put($ positional information, terminal)", thereby constructing "put ((Xe, Ye), 103)".

Next, the transmitting unit 208 checks whether or not the terminal identifier "101" and the terminal identifier "103" of the grandma's terminal apparatus are managed in a group in the group information storage unit 203. In the group information management table in FIG. 10, "101" and "103" are managed in a group. Accordingly, the transmitting unit 208 judges that a command such as "put((Xe, Ye), 103)" may be transmitted to the grandma's terminal apparatus 1. The transmitting unit 208 transmits "put((Xe, Ye), 103)", to the terminal apparatus 1 with "103". Note that "put((Xe, Ye), 103)" is a command to give notice of the positional information (Xe, Ye) of the terminal apparatus 1.

The positional information (Xe, Ye) of the terminal apparatus 1 is received and temporarily stored by the grandma's terminal apparatus 1. Note that guide processing described below is preferably performed also in the case where information for asking whether or not guide processing is permitted to be performed is output to the grandma's terminal apparatus 1, and information indicating "permission" is received from the grandma's terminal apparatus 1.

Next, the transmitting unit 208 transmits the command "start_up(navi( ));", to the terminal apparatus 1 with "103".

Next, the grandma's terminal apparatus 1 receives the command "start_up(navi( ));", and starts navi( ) according to the command. That is to say, in the grandma's terminal apparatus 1, a navigation system (one of the terminal function units) is started. It is assumed that, in the grandma's terminal apparatus 1, the scenario "start_up(navi( ))" contains information indicating that the navigation system is to be started.

Next, the transmitting unit 208 transmits the command "set_destination($ positional information);" to the terminal apparatus with "103".

Next, the grandma's terminal apparatus 1 receives the command "set_destination($ positional information);", and sets the positional information (Xe, Ye) as the destination position to the navigation system according to the command. It is assumed that, in the grandma's terminal apparatus 1, the scenario "set_destination($ positional information);" contains information indicating that "$ positional information" is to be set as the destination position of the navigation system.

Next, the transmitting unit 208 transmits the command "route_search($ current position, $ destination position);", to the terminal apparatus 1 with "103".

Next, the grandma's terminal apparatus 1 substitutes the current position of the grandma's terminal apparatus for the variable "$ current position" of the command "route_search($ current position, $ destination position);". The grandma's terminal apparatus 1 substitutes the positional information (Xe, Ye) for the variable "$ destination position". It is assumed that the grandma's terminal apparatus 1 has a function of acquiring positional information, such as a GPS receiver, and can acquire "$ current position" using this function.

The grandma's terminal apparatus 1 executes the command "route_search((Xf, Yf), (Xe, Ye));", thereby performing a route search for navigation. Thus, the grandma's terminal apparatus 1 performs route guide. The destination position in the route guide is a position at which the user who performs voice input "bring grandma here" is located. It is assumed that, in the grandma's terminal apparatus 1, the scenario "route_search((Xf, Yf), (Xe, Ye));" contains information indicating that route guide between two positions is to be performed using the navigation system.

According to this specific example, based on a user operation at one terminal apparatus 1, another terminal apparatus 1 can be operated. According to this specific example, based on a user operation at one terminal apparatus 1, only another terminal apparatus 1 managed in that group can be operated.

Specific Example 4

In Specific Example 4, an information system will be described in which an object can move between terminals. More specifically, a case will be described in which the user of the terminal apparatus 1 causes a character located at the terminal apparatus 1 to move to another terminal apparatus. It is assumed that the user of the terminal apparatus 1 is the user identified with the user identifier "A".

Furthermore, it is assumed that the character with the character identifier "1" is currently located at the terminal apparatus 1 of the user "A" (the terminal identifier "101"), and this fact (user identifier: A, terminal identifier: 101, character identifier: 1) is stored in the current information management table in FIG. 23. That is to say, it is assumed that "object identifier=1" in the record with "ID=1" in FIG. 23.

It is assumed that, in this status, the user "A" inputs the user identifier "A" and the voice "come here", to the terminal apparatus 1 identified with the terminal identifier "501" (hereinafter, a terminal "501").

Next, the terminal accepting unit 104 of the terminal "501" accepts the user identifier "A" and the voice "come here". Next, the terminal request constructing unit 105 judges to construct a terminal request, using the accepted data.

Next, the terminal request constructing unit 105 of the terminal "501" constructs a terminal request (501, A, "come here"), using the user identifier "A", the voice "come here", and the terminal identifier "501" of the terminal "501". It is assumed that the terminal request constructing unit 105 has a voice recognition function, and converts the voice "come here" into a character string "come here". It is assumed that the terminal "501" holds the terminal identifier "501" in advance.

Next, the terminal transmitting unit 106 of the terminal "501" transmits the constructed terminal request (501, A, "come here"), to the server apparatus 22.

Next, the receiving unit 205 of the server apparatus 22 receives the terminal request (501, A, "come here"), from the terminal apparatus 1.

Next, the terminal request processing unit 206 interprets the terminal request received by the receiving unit 205. The terminal request processing unit 206 judges that there is processing that is to be performed by the server apparatus 22, using an interpretation result of the terminal request. That is to say, the terminal request processing unit 206 judges that "come here" matches the record with "ID=4" in the table in FIG. 20. The terminal request processing unit 206 obtains scenario base information "ch=get_char($ user identifier, $ character); delete($ user identifier, $ character); put_char($ terminal identifier, ch)", in the record with "ID=4". The obtained scenario base information contains variables, and, thus, the terminal request processing unit 206 judges that there is processing that is to be performed by the server apparatus 22.

Next, the terminal request processing unit 206 acquires "A" corresponding to "$ user identifier", from the terminal request. The terminal request processing unit 206 acquires information on the character with "ID=1" corresponding to "$ character". From (user identifier: A, terminal identifier: 101, character identifier: 1), the terminal request processing unit 206 can acquire the character identifier "1" corresponding to the user identifier "A". The terminal request processing unit 206 acquires "501" corresponding to "$ terminal identifier", from the terminal request.

Next, the scenario generating unit 207 substitutes values for the variables of "ch=get_char($ user identifier, $ character);", thereby obtaining "ch=get_char(A, 1);". The scenario generating unit 207 executes "ch=get_char(A, 1);", and substitutes character information for the variable "ch". Next, the scenario generating unit 207 substitutes values for the variables of "delete($ user identifier, $ character);", thereby obtaining "delete(A, 1);". The scenario generating unit 207 executes "delete(A, 1);", and acquires character information corresponding to the user identifier "A" and the terminal identifier "101" of the terminal apparatus 1 at which the character is currently located. The character information includes a character image.

The transmitting unit 208 transmits "delete(A, 1);", to the terminal apparatus 1 identified with the terminal identifier "101". The terminal receiving unit 107 of the terminal apparatus 1 identified with the terminal identifier "101" receives the scenario "delete(A, 1);", and the terminal parser unit 108 interprets the scenario. The terminal function calling unit 109 deletes the character with "ID=1", from the display screen.

Next, the scenario generating unit 207 substitutes a value for the variable of "put_char($ terminal identifier, ch)", thereby obtaining "put_char(501, ch)". It is assumed that the character information has been substituted for the variable "ch".

Next, the transmitting unit 208 transmits "put_char(501, ch)", to the terminal "501" identified with the terminal identifier "501".

Next, the user management information changing unit 215 judges that the instruction from the user is to change the terminal apparatuses 1, from the terminal request or the transmitted scenario. The user management information changing unit 215 changes the terminal identifier corresponding to the user identifier "A" from "101" to "501", in the user management information management table in FIG. 24.

Next, the current information update unit 213 updates the current information in response to transmission of the scenario to the terminal apparatus 1. That is to say, the current information update unit 213 changes the attribute values corresponding to the terminal apparatus identifier "101" in the current information management table in FIG. 23 such that the attribute value of the object identifier becomes "NULL(-)" and the attribute value of the image ID becomes "NULL(-)". The current information update unit 213 further changes the attribute values corresponding to the terminal apparatus identifier "501" such that the attribute value of the object identifier becomes"1" and the attribute value of the image ID becomes "1".

Next, the terminal receiving unit 107 of the terminal "501" receives "put_char(501, ch)". The terminal parser unit 108 interprets "put_char(501, ch)". The terminal function calling unit 109 of the terminal "501" gives data of the variable "ch" (data of the character) to the character driver, thereby starting the character driver. Thus, the character is displayed on the display screen of the terminal "501".

As described above, according to this specific example, an object can move between terminals.

As described above, according to this embodiment, it is possible to allow a terminal apparatus including one or more pieces of hardware driven by drivers and not having sufficient information processing ability, to perform complicated information processing while effectively utilizing the one or more pieces of hardware.

According to this embodiment, a server apparatus manages the current statuses of terminal apparatuses, thereby making it possible to allow a terminal apparatus not having sufficient information processing ability, to perform complicated information processing while effectively utilizing one or more pieces of hardware.

According to this embodiment, a server apparatus manages drivers of terminal apparatuses, thereby making it possible to allow a terminal apparatus not having sufficient information processing ability, to perform complicated information processing while effectively utilizing one or more pieces of hardware. According to this embodiment, it is possible to easily register and manage drivers included in terminal apparatuses.

According to this embodiment, it is possible to change terminal apparatuses on which processing is to be performed, during the processing.

In this embodiment, processing is performed in which the server apparatus 22 interprets the terminal request transmitted from the terminal apparatus 1 and returns a scenario to the terminal apparatus 1. Note that the server apparatus 22 may transmit a scenario to the terminal apparatus 1 if a predetermined condition is met, even in the case where no terminal request is received from the terminal apparatus 1. The predetermined condition is, for example, that it is a predetermined time, that the state of the server apparatus 22 meets a predetermined condition, or the like. The state of the server apparatus 22 meeting a predetermined condition is, for example, a state in which the CPU load is a threshold or less, that the server apparatus 22 has been started, or the like.

In this embodiment, for example, when the server apparatus 22 has a failure, the terminal apparatus 1 stands by until the server apparatus 22 is recovered from the failure or until notice of recovery from the failure is received from the server apparatus 22, and the terminal apparatus 1's own function operates. In this case, typically, the terminal apparatus 1 holds (saves) the current state. The terminal apparatus 1's own function is, for example, a state in which the OS can accept an instruction or the like from the user. If notice of recovery from the failure is received from the server apparatus 22, the terminal apparatus 1 calls the saved state, and resumes the communication with the server apparatus 22.

Furthermore, when the terminal apparatus 1 performs processing, typically, the terminal apparatus 1 is in continuous communication with the server apparatus 22. Accordingly, if the server apparatus 22 has a failure, for example, the processing by the terminal apparatus 1 may be stopped.

The software that realizes the server apparatus 22 in this embodiment may be the following sort of program. Specifically, this program is a program using a storage medium in which one or more pieces of correspondence information each indicating correspondence between information forming a terminal request and scenario base information, which is information based on which a scenario is to be constructed, are stored, and in which current information, which is information indicating a current state of a terminal apparatus, is stored for each terminal apparatus, for causing a computer to function as: a receiving unit that receives a terminal request from a terminal apparatus; a terminal request processing unit that interprets the terminal request received by the receiving unit, thereby acquiring scenario base information corresponding to the terminal request, from the storage medium, and performs processing corresponding to the terminal request received by the receiving unit; a scenario generating unit that generates a scenario, using the scenario base information acquired by the terminal request processing unit, a processing result of the processing performed by the terminal request processing unit, and current information corresponding to the terminal apparatus; a transmitting unit that transmits the scenario generated by the scenario generating unit, to the terminal apparatus; and a current information update unit that updates the current information in response to transmission of the scenario to the terminal apparatus.

Figure 26:
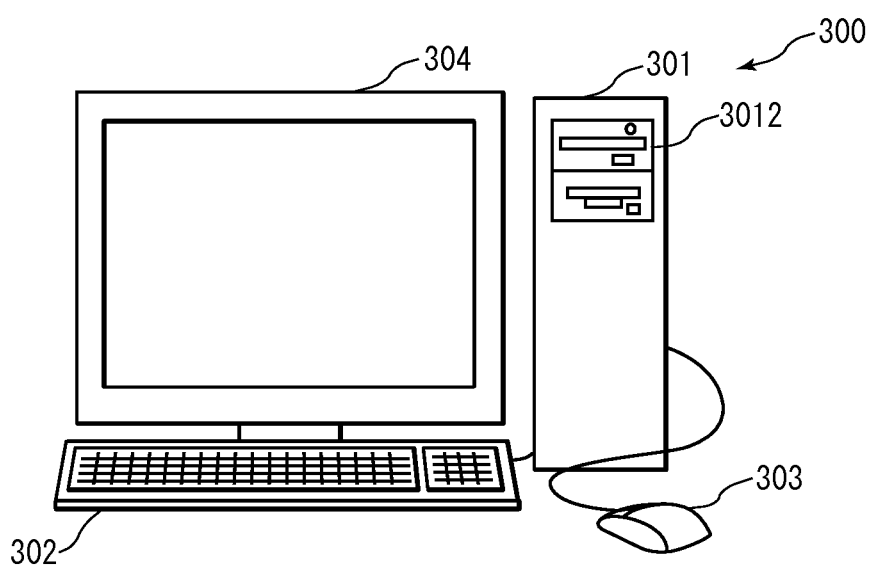
FIG. 26 is a schematic view of a computer system in the embodiments.
Figure 27:
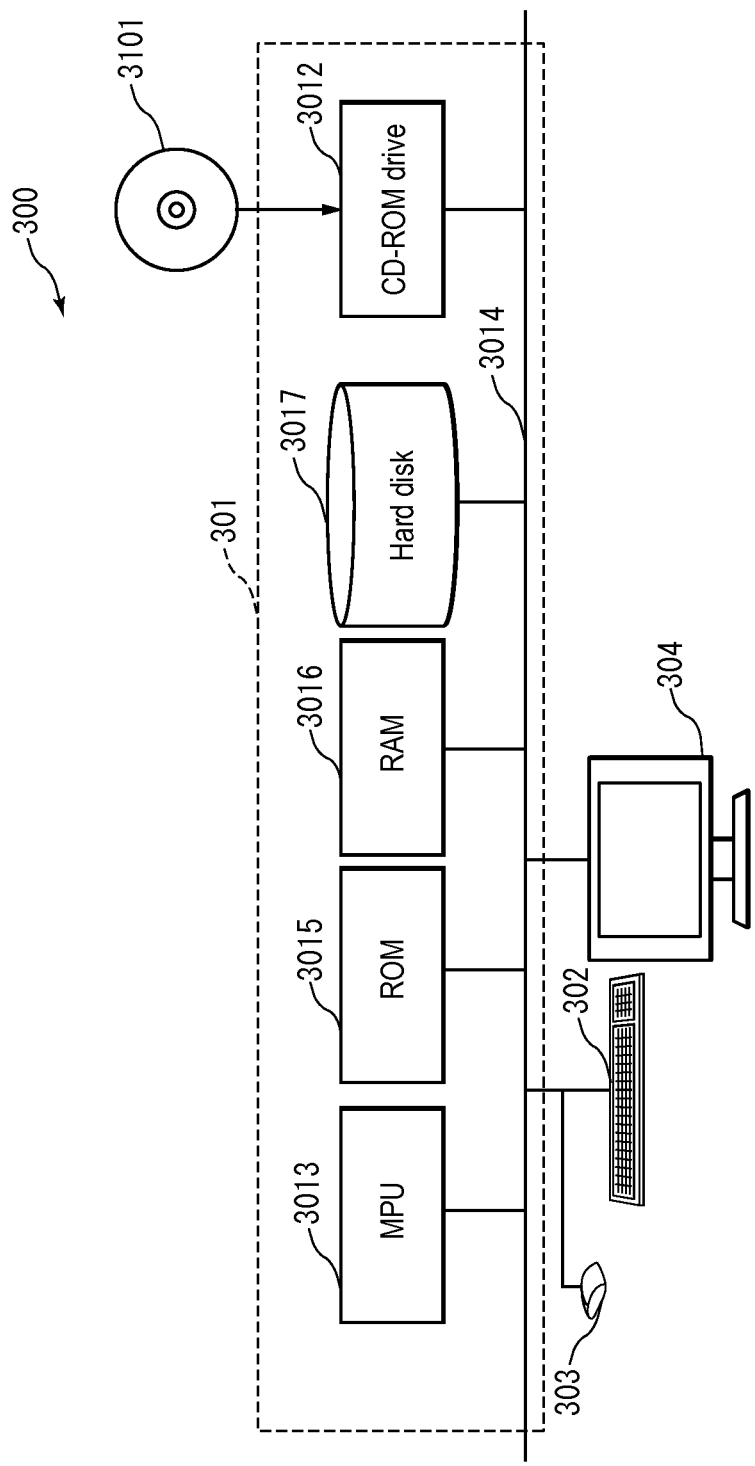
FIG. 27 is a block diagram of the computer system in the embodiments.

FIG. 26 shows the external appearance of a computer that executes the program described in this specification to realize the information system in the various foregoing embodiments. The foregoing embodiments may be realized using computer hardware and a computer program executed thereon. FIG. 26 is a schematic view of a computer system 300. FIG. 27 is a block diagram of the computer system 300.

In FIG. 26, the computer system 300 includes a computer 301 including a CD-ROM drive, a keyboard 302, a mouse 303, a monitor 304, a microphone 305, and a loudspeaker 306.

In FIG. 27, the computer 301 includes not only the CD-ROM drive 3012, but also an MPU 3013, a bus 3014, a ROM 3015, a RAM 3016, and a hard disk 3017. The bus 3014 is connected to the MPU 3013 and the CD-ROM drive 3012. In the ROM 3015, a program such as a boot up program is stored. The RAM 3016 is connected to the MPU 3013, and is a memory in which a command of an application program is temporarily stored and a temporary storage area is to be provided. In the hard disk 3017, an application program, a system program, and data are to be stored. Although not shown, the computer 301 may further include a network card that provides connection to a LAN.

The program for causing the computer system 300 to execute the functions of the information system in the foregoing embodiments may be stored in a CD-ROM 3101 that is inserted into the CD-ROM drive 3012, and be transmitted to the hard disk 3017. Alternatively, the program may be transmitted via a network (not shown) to the computer 301 and stored in the hard disk 3017. At the time of execution, the program is loaded into the RAM 3016. The program may be loaded from the CD-ROM 3101, or directly from a network.

The program does not necessarily have to include, for example, an operating system or a third party program to cause the computer 301 to execute the functions of the information system in the foregoing embodiments. The program may only include a command portion to call an appropriate function (module) in a controlled mode and obtain the desired results. The manner in which the computer system 300 operates is well known, and, thus, a detailed description thereof has been omitted.

It should be noted that, in the program, in a transmitting step of transmitting information, a receiving step of receiving information, or the like, processing that is performed by hardware, for example, processing performed by a modem or an interface card in the transmitting step (processing that can be performed only by hardware) is not included.

Furthermore, the computer that executes this program may be a single computer, or may be multiple computers.

More specifically, centralized processing may be performed, or distributed processing may be performed.

Furthermore, in the foregoing embodiments, it will be appreciated that two or more communication parts in one apparatus may be physically realized by one medium.

Furthermore, in the foregoing embodiments, each processing may be realized as centralized processing using a single apparatus, or may be realized as distributed processing using multiple apparatuses.

It will be appreciated that the present invention is not limited to the embodiments set forth herein, and various modifications are possible within the scope of the present invention.

INDUSTRIAL APPLICABILITY

As described above, the information system according to the present invention has an effect that this system can allow a terminal apparatus including one or more pieces of hardware driven by drivers and not having sufficient information processing ability, to perform complicated information processing while effectively utilizing the one or more pieces of hardware, and, thus, this system is useful as an information system and the like.

LIST OF REFERENCE NUMERALS

1 Terminal apparatus
2, 20 Server apparatus
3 Network
101 Terminal function unit
102 Terminal driver management unit
103 Terminal object storage unit
104 Terminal accepting unit
105 Terminal request constructing unit
106 Terminal transmitting unit
107 Terminal receiving unit
108 Terminal parser unit
109 Terminal function calling unit
110 Terminal object output unit
200 Current information storage unit
201 Correspondence information storage unit
202 Server driver management unit
203 Group information storage unit
204 History storage unit
205 Receiving unit
206 Terminal request processing unit
207 Scenario generating unit
208 Transmitting unit
209 History accumulating unit
210 Accepting unit
211 Statistical processing result acquiring unit
212 Statistical processing result output unit
213 Current information update unit
214 User management information storage unit
215 User management information changing unit
2021 Type-based driver information storage part
2022 Terminal management information storage part

The invention claimed is:

1. An information system, comprising one or at least two terminal apparatuses and a server apparatus,
wherein each of the terminal apparatuses includes:
a plurality of hardware components driven by a plurality of drivers;
a non-transitory computer-readable storage medium configured to store a plurality of driver identifiers for identifying the plurality of drivers;
a terminal accepting device that accepts one or more instructions from a user;
a processor configured to construct a terminal request, which is a request corresponding to the one or more instructions, the terminal request including (1) an object identifier of an object displayed on a screen of the terminal apparatus, (2) an operation type identifier identifying a user's action on the screen of the terminal apparatus, and (3) position information on the screen where the user's action occurs;
a terminal transmitting device that transmits the terminal request to the server apparatus;
a terminal receiving device that receives a scenario having a command and data from the server apparatus to operate the object displayed on the screen of the terminal apparatus to cause a display change and voice generation associated with the object, in response to transmission of the terminal request, wherein the command includes a driver identifier identifying a hardware component for invocation;
wherein the processor is configured to:
interpret the scenario, and
invoke the hardware component identified by the command with the data included in the scenario, and
wherein the server apparatus includes:
a non-transitory computer-readable storage medium storing:
one or more pieces of correspondence information each indicating correspondence between information forming a terminal request and scenario based information;
the plurality of driver identifiers for identifying the plurality of drivers on each terminal apparatus;
a receiving device that receives a terminal request from the terminal apparatus;
a processor configured to:
interpret the terminal request received by the receiving device,
acquire scenario based information corresponding to the terminal request, from the storage medium; and
generate a scenario, using the scenario based information, wherein the scenario identifies the hardware component on the terminal apparatus for invocation; and
a transmitting device that transmits the generated scenario to the terminal apparatus.

2. The information system according to claim 1,
wherein the storage medium of the terminal apparatus further stores one or more objects; and
wherein the processor of the terminal apparatus is configured to output the one or more objects;
wherein the scenario has an operation command, which is a command indicating an operation of an object,
wherein the processor of the terminal apparatus interprets the scenario to acquire the operation command from the scenario, and causes an object corresponding to the operation command to operate according to the operation command.

3. The information system according to claim 1,
wherein the storage medium of the server apparatus further stores one or more request histories, each of which is part or the whole of a terminal request; and
wherein the processor of the server apparatus is configured to:

accumulate a request history, which is part or the whole of the terminal request received by the receiving device, for storage in the storage medium; and generate the scenario, using the terminal request received by the receiving device and the one or more request histories stored in the storage medium.

4. The information system according to claim 1, wherein the processor of the server apparatus generates different scenarios according to the one or more driver identifiers stored in the storage medium of the server apparatus.

5. The information system according to claim 3, wherein the processor of the server apparatus is configured to:

perform statistical processing on the request histories to acquire a statistical processing result; and output the statistical processing result.

6. The information system according to claim 1, wherein the generated scenario contains a command for another terminal apparatus, which is different from the terminal apparatus, and the transmitting device of the server apparatus transmits the command to the another terminal apparatus.

7. The information system according to claim 6, wherein the storage medium of the server apparatus further stores group information, which is information specifying a group of two or more terminal apparatuses and is information having two or more terminal identifiers each for identifying each of the two or more terminal apparatuses, and wherein the transmitting device of the server apparatus transmits no command to a terminal apparatus corresponding to none of the two or more terminal identifiers contained in the group information.

8. The information system according to claim 1, wherein the storage medium of the server apparatus further stores current information for each terminal apparatus, which is information indicating a current state of a terminal apparatus, wherein the processor of the server apparatus generates the scenario, using the scenario based information and the current information corresponding to the terminal apparatus, and wherein the processor of the server apparatus updates the current information in response to transmission of the scenario to the terminal apparatus.

9. The information system according to claim 8, wherein the storage medium of the server apparatus stores one or more driver identifiers each for identifying the driver of each of the hardware components included in the one or at least two terminal apparatuses, wherein the processor of the server apparatus generates different scenarios according to the one or more driver identifiers stored in the storage medium.

10. The information system according to claim 9, wherein the storage medium of the server apparatus stores:

one or more pieces of type-based driver information each for associating a type identifier indicating a type of terminal apparatus and one or more driver identifiers; and one or more pieces of terminal management information each for associating a terminal identifier for identifying a terminal apparatus and a type identifier.

11. The information system according to claim 9 or 10, wherein the storage medium of the server apparatus further stores one or more pieces of user management information each for associating a user identifier for identifying a user of a terminal apparatus and a terminal identifier; and wherein the processor of the server apparatus is configured to:

in a case where the terminal request is a request to change a terminal apparatus on which processing is to be performed, change the terminal identifier contained in the storage medium and corresponding to a user identifier of a user of the terminal apparatus from which the terminal request was transmitted, to a terminal identifier of a new terminal apparatus so that the terminal apparatus on which processing is to be performed is changed from a previous terminal apparatus, which is a terminal apparatus on which processing is currently being performed, to the new terminal apparatus;

generate the scenario, using current information of the previous terminal apparatus, and wherein the transmitting device of the server apparatus transmits the generated scenario to the new terminal apparatus.

12. A terminal apparatus, comprising:

one or more hardware components each of which is driven by a driver;

a non-transitory computer-readable storage medium storing one or more driver identifiers each for identifying the driver of each of the one or more hardware components;

a terminal accepting device that accepts one or more instructions from a user;

a processor configured to construct a terminal request, which is a request corresponding to the one or more instructions, the terminal request including (1) an object identifier of an object displayed on a screen of a terminal apparatus, (2) an operation type identifier identifying a user's action on the screen of the terminal apparatus, and (3) position information on the screen where the user's action occurs;

a terminal transmitting device that transmits the terminal request to a server apparatus; and a terminal receiving device that receives a scenario having a command and data from the server apparatus to operate the object displayed on the screen of the terminal apparatus to cause a display change and voice generation associated with the object, in response to transmission of the terminal request, wherein the command includes a driver identifier identifying a hardware component for invocation;

wherein the processor is configured to interpret the scenario, and invoke the hardware component identified by the command with the data included in the scenario.

13. A server apparatus, comprising:

a non-transitory computer-readable storage medium storing:

one or more pieces of correspondence information each indicating correspondence between information forming a terminal request and scenario based information, which is information based on which a scenario is to be constructed;

a plurality of driver identifiers for identifying a plurality of drivers driving a plurality of hardware components on a terminal apparatus;

a receiving device that receives a terminal request from the terminal apparatus, the terminal request including (1) an object identifier of an object displayed on a screen of the terminal apparatus, (2) an operation type identifier identifying a user's action on the screen of the terminal apparatus, and (3) position information on the screen where the user's action occurs;

a processor configured to:
interpret the terminal request received by the receiving unit,
acquire scenario based information corresponding to the terminal request, from the storage medium, and
generate a scenario to operate the object displayed on the screen of the terminal apparatus to cause a display change and voice generation associated with the object, using the scenario based information, wherein the scenario identifies a driver identifier for invoking a hardware component on the terminal apparatus; and a transmitting device that transmits the generated scenario to the terminal apparatus.

14. An information processing method, using a storage medium storing at least one driver identifier identifying at least one driver that drives at least one hardware component, and realized by the at least one hardware component, a terminal accepting device, a processor, a terminal transmitting device, and a terminal receiving device, the method comprising:

a terminal accepting step of the terminal accepting device accepting one or more instructions from a user;

a terminal request constructing step of the processor constructing a terminal request, which is a request corresponding to the one or more instructions, the terminal request including (1) an object identifier of an object displayed on a screen of a terminal apparatus, (2) an operation type identifier identifying a user's action on the screen of the terminal apparatus, and (3) position information on the screen where the user's action occurs;

a terminal transmitting step of the terminal transmitting device transmitting the terminal request to a server apparatus;

a terminal receiving step of the terminal receiving device receiving a scenario having a command and data from the server apparatus to operate the object displayed on the screen of the terminal apparatus to cause a display change and voice generation associated with the object, in response to transmission of the terminal request, wherein the command includes a driver identifier identifying a hardware component for invocation;

a terminal parser step of the processor interpreting the scenario; and invoking, by the processor, the hardware component identified by the command with the data included in the scenario.

15. An information processing method, using a storage medium in which one or more pieces of correspondence information each indicating correspondence between information forming a terminal request and scenario based information, which is information based on which a scenario is to be constructed, are stored, and realized by a receiving device, a processor, and a transmitting device, the method comprising:

storing, by the storage medium, a plurality of driver identifiers for identifying a plurality of drivers on a terminal apparatus;

a receiving step of the receiving device receiving a terminal request from the terminal apparatus, the terminal request including (1) an object identifier of an object displayed on a screen of the terminal apparatus, (2) an operation type identifier identifying a user's action on the screen of the terminal apparatus, and (3) position information on the screen where the user's action occurs;

a terminal request processing step of the processor interpreting the terminal request received in the receiving step and acquiring scenario based information corresponding to the terminal request, from the storage medium;

a scenario generating step of the processor generating a scenario to operate the object displayed on the screen of the terminal apparatus to cause a display change and voice generation associated with the object, using the scenario based information acquired in the terminal request processing step, wherein the scenario identifies a driver identifier for invoking a hardware component on the terminal apparatus; and a transmitting step of the transmitting device transmitting the scenario generated in the scenario generate step, to the terminal apparatus.

* * * * *